US009068821B2

(12) United States Patent
Fujimoto

(10) Patent No.: US 9,068,821 B2
(45) Date of Patent: Jun. 30, 2015

(54) OPTICAL MEASURING DEVICE WITH POSITIONAL DISPLACEMENT DETECTION

(71) Applicant: Keyence Corporation, Osaka (JP)

(72) Inventor: Takashi Fujimoto, Osaka (JP)

(73) Assignee: Keyence Corporation, Osaka (JP)

( * ) Notice: Subject to any disclaimer, the term of this patent is extended or adjusted under 35 U.S.C. 154(b) by 165 days.

(21) Appl. No.: 13/904,146

(22) Filed: May 29, 2013

(65) Prior Publication Data

US 2013/0342852 A1  Dec. 26, 2013

(30) Foreign Application Priority Data

Jun. 25, 2012 (JP) ................................. 2012-141532

(51) Int. Cl.
*G01B 11/14* (2006.01)
*G01B 11/10* (2006.01)
*G01B 11/02* (2006.01)

(52) U.S. Cl.
CPC ............. *G01B 11/14* (2013.01); *G01B 11/026* (2013.01); *G01B 11/105* (2013.01)

(58) Field of Classification Search
CPC ..... G01B 11/14; G01B 11/105; G01B 11/026
See application file for complete search history.

(56) References Cited

U.S. PATENT DOCUMENTS

| 4,333,716 A * | 6/1982 | Sakane et al. ................. 396/110 |
| 5,235,375 A * | 8/1993 | Yamana et al. ............... 396/101 |
| 2004/0165276 A1 * | 8/2004 | Yahagi et al. ................. 359/629 |
| 2006/0044454 A1 * | 3/2006 | Kuwakino .................... 348/350 |
| 2008/0225159 A1 * | 9/2008 | Kanayama .................... 348/349 |
| 2012/0133819 A1 * | 5/2012 | Liu et al. ....................... 348/345 |
| 2012/0242867 A1 * | 9/2012 | Shuster ....................... 348/240.2 |

FOREIGN PATENT DOCUMENTS

JP   2002-277211   9/2002

* cited by examiner

*Primary Examiner* — Michael A Lyons
*Assistant Examiner* — Violeta A Prieto
(74) *Attorney, Agent, or Firm* — Kilyk & Bowersox, P.L.L.C.

(57) ABSTRACT

Provided is an optical measuring device capable of easily improving accuracy in measurement of a measurement object. Light is projected from a light projecting unit into a measurement space. Light passing through the measurement space is directed toward a first image sensor through a first optical system, and directed toward a second image sensor through a second optical system. Within the measurement space, a position of a first focus of the first optical system and a position of a second focus of the second optical system in an X direction are different from each other. Whether the measurement object is positioned at the first focus, on a side of the first focus closer to the light projecting unit, or on a side of the first focus away from the light projecting unit is determined based on the signals outputted from the first and the second image sensor.

10 Claims, 14 Drawing Sheets

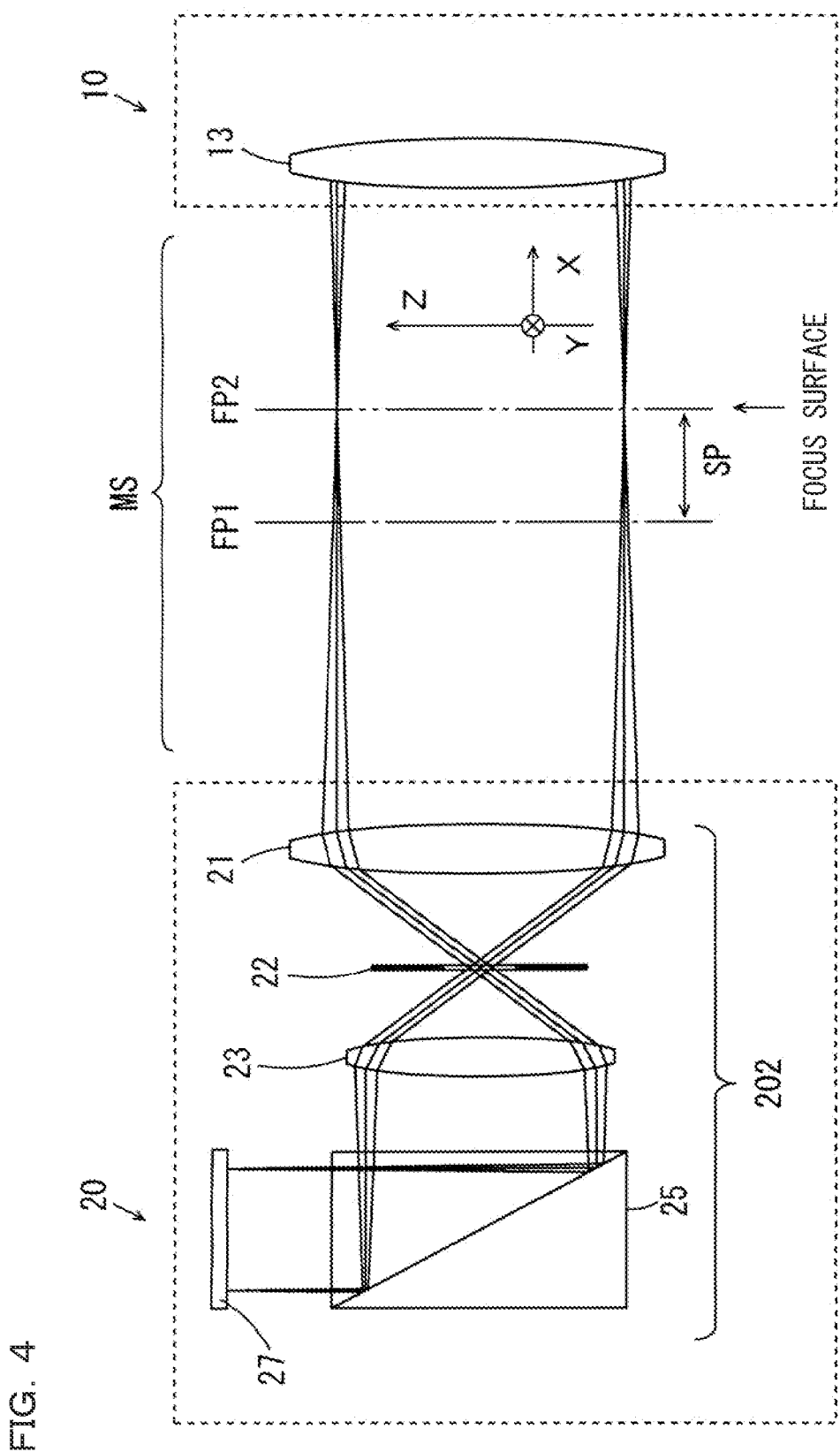

OPTICAL MEASURING DEVICE WITH POSITIONAL DISPLACEMENT DETECTION

CROSS-REFERENCE TO RELATED APPLICATIONS

The present application claims foreign priority based on Japanese Patent Application No. 2012-141532, filed Jun. 25, 2012, the contents of which is incorporated herein by reference.

BACKGROUND OF THE INVENTION

1. Field of the Invention

The present invention relates to an optical measuring device which irradiates a measurement object with light and measures a light amount distribution of light transmitted through or reflected on the object.

2. Description of Related Art

Conventionally, there has been used an optical measuring device configured to measure dimensions of an object, an interval between objects, a position of an object, a shape of an object, and the like by irradiating the object with light from a light source and by measuring a light amount distribution of light transmitted through or reflected on the object.

According to the optical measuring device described in JP 2002-277211 A, light emitted from a light source of a light projecting unit is diffused by a light diffusing unit and converted by a transmitter lens into substantially collimated light. The collimated light after the conversion is projected to a light receiving unit with a measurement object placed therebetween.

The light projected from the light projecting unit is converged by a first lens of the light receiving unit, passes through an aperture of a diaphragm, and produces an image on the light receiving surface of a CCD (charge-coupled device) image sensor by a second lens. The CCD image sensor outputs an analog output signal corresponding to an amount of the received light. An A/D converter of a controller converts the output signal of the CCD image sensor into a digital signal, and writes the digital signal in a data memory as received light amount data. A CPU (central processing unit) detects positions of edges of the measurement object based on the received light amount data stored in the data memory, and calculates a distance between the edges specified by the operation switch and outputs a result of the calculation.

According to the optical measuring device described above, the focus of the optical system of the light receiving unit from the first lens to the light receiving surface of the CCD image sensor is positioned between the transmitter lens of the light projecting unit and the first lens of the light receiving unit. If the edge of the measurement object is at the focus position of the optical system of the light receiving unit (hereinafter, referred to as a focused position), the received light amount in the received light amount distribution indicated by the received light amount data changes steeply at a portion corresponding to the edge position of the measurement object. Thus, it is possible to easily and correctly detect the edge position of the measurement object.

On the other hand, if the edge of the measurement object is displaced from the focused position, the received light amount in the received light amount distribution indicated by the received light amount data changes moderately at the portion corresponding to the edge position of the measurement object. In this case, it may not be possible to correctly detect the edge position of the measurement object. Therefore, when detecting the edge position of the measurement object, it is preferable to position the measurement object as close as possible to the focused position.

Whether or not the edge of the measurement object is at the focused position can be determined based on a ratio of change in the received light amount at the portion corresponding to the edge position of the measurement object in the received light amount distribution indicated by the received light amount data. However, it is not possible to determine whether the measurement object is on a side of the focused position closer to the light projecting unit, or on a side of the focused position away from the light projecting unit. In this case, it is difficult to move the measurement object toward the focused position. Therefore, it is not easily to improve accuracy in measurement of the edge position of the measurement object.

SUMMARY OF THE INVENTION

An object of the present invention is to provide an optical measuring device capable of easily improving accuracy in measurement of a measurement object.

(1) An optical measuring device according to one embodiment of the present invention includes: a light projecting unit configured to project light into a measurement space in which a measurement object is to be placed, the light being projected in parallel to a first direction; a first light receiving unit and a second light receiving unit each configured to output a signal indicating a received light amount; a first optical system having a first focus within the measurement space, and configured to direct the light projected from the light projecting unit and passing through the measurement space toward the first light receiving unit; a second optical system having a second focus within the measurement space, and configured to direct the light projected from the light projecting unit and passing through the measurement space toward the second light receiving unit, the second focus being at a position different from a position of the first focus in the first direction; and a control unit configured to calculate a position of the measurement object in a second direction based on the signal outputted from the first light receiving unit, the second direction intersecting the first direction, wherein the control unit determines whether the measurement object is in a first state, a second state, or a third state based on the signals outputted from the first light receiving unit and the second light receiving unit, the first state being a state in which the measurement object is positioned on a side closer to the light projecting unit with respect to the first focus in the first direction, the second state being a state in which the measurement object is positioned on a side away from the light projecting unit with respect to the first focus, the third state being a state in which the measurement object is positioned at the first focus.

According to this optical measuring device, the light is projected from the light projecting unit to the measurement space in parallel to the first direction. The light passing through the measurement space is directed through the first optical system toward the first light receiving unit. The first light receiving unit outputs a signal indicating the received light amount. Further, the light passing through the measurement space is directed through the second optical system toward the second light receiving unit. The second light receiving unit outputs a signal indicating the received light amount.

In the measurement space, the position of the first focus in the first direction and the position of the second focus in the first direction are different from each other. With this, it is possible to easily and correctly determine whether the measurement object is in the first state, the second state, or the third state, based on the signals outputted from the first light receiving unit and the second light receiving unit.

The position of the measurement object in the second direction intersecting the first direction is calculated based on the signal outputted from the first light receiving unit. In this case, it is possible to easily improve accuracy in the measurement of the position of the measurement object by moving the measurement object toward the first focus along the first direction based on the determination result as to whether the measurement object is in the first state, the second state, or the third state.

(2) The control unit may calculate a positional displacement amount of the measurement object from the first focus in the first direction based on at least one of the signal outputted from the first light receiving unit and the signal outputted from the second light receiving unit.

In this case, the positional displacement amount of the measurement object from the first focus is calculated. With this, based on the determination result as to whether the measurement object is in the first state, the second state, or the third state and the calculation result of the positional displacement amount of the measurement object, it is possible to easily and correctly move the measurement object toward the position of the first focus.

(3) The control unit may be configured to: calculate a first value corresponding to the positional displacement amount of the measurement object from the first focus in the first direction based on the calculation of the signal outputted from the first light receiving unit; calculate a second value corresponding to a positional displacement amount of the measurement object from the second focus in the first direction based on the calculation of the signal outputted from the second light receiving unit; calculate the positional displacement amount of the measurement object from the first focus in the first direction based on at least one of the calculated first value and the calculated second value; and determine whether the measurement object is in the first state, the second state, or the third state based on the first value and the second value.

In this case, by calculating the first value and the second value, the positional displacement amount of the measurement object from the first focus is calculated based on at least one of the calculated first value and the calculated second value. Further, whether the measurement object is in the first state, the second state, or the third state is determined based on the first value and the second value.

In this manner, by calculating the first value and the second value, it is possible to calculate the positional displacement amount of the measurement object from the first focus, and to determine whether the measurement object is in the first state, the second state, or the third state.

(4) The control unit may be configured to: calculate the positional displacement amount of the measurement object from the first focus in the first direction based on the calculation using the calculated second value; and determine whether the measurement object is in the first state, the second state, or the third state based on the calculated positional displacement amount and the calculated first value.

When the measurement object is close to the position of the first focus in the first direction, the positional displacement amount of the measurement object from the second focus is greater than the positional displacement amount of the measurement object from the first focus.

Therefore, as compared to the case where the positional displacement amount of the measurement object from the first focus is calculated based on the calculation using the first value, it is possible to calculate the positional displacement amount of the measurement object from the second focus at high accuracy by the calculation using the second value.

As a result, it is possible to calculate the positional displacement amount of the measurement object from the first focus at high accuracy based on the positional displacement amount of the measurement object from the second focus. Further, whether the measurement object is in the first state, the second state, or the third state is determined at high accuracy based on the calculated positional displacement amount of the measurement object from the first focus and the calculated first value.

(5) The optical measuring device may further include: a storage unit configured to store first reference data and second reference data, the first reference data and the second reference data respectively indicating reference received light amount distributions of the first light receiving unit and the second light receiving unit when the measurement object is absent within the measurement space, wherein upon the measurement of the measurement object, the control unit may: correct the signals outputted from the first light receiving unit and the second light receiving unit based on the first reference data and the second reference data stored in the storage unit, such that received light amount distributions corresponding to a portion in the measurement space excluding the measurement object out of the received light amount distributions indicated by the signals outputted from the first light receiving unit and the second light receiving unit become equal to the reference received light amount distributions; calculate the position of the measurement object in the second direction intersecting the first direction based on the corrected signal outputted from the first light receiving unit; determine whether the measurement object is in the first state, the second state, or the third state based on the corrected signals outputted from the first light receiving unit and the second light receiving unit; and calculate the positional displacement amount of the measurement object from the first focus in the first direction based on at least one of the corrected signal outputted from the first light receiving unit and the corrected signal outputted from the second light receiving unit.

Due to tarnish on the first optical system and the second optical system, or dirt attached to the first optical system and the second optical system, there is a case where the received light amount distributions of the first light receiving unit and the second light receiving unit become different from the reference received light amount distributions when the measurement object is absent within the measurement space.

According to the present invention, the first reference data and the second reference data respectively indicating the reference received light amount distributions of the first light receiving unit and the second light receiving unit when the measurement object is absent within the measurement space are previously stored in the storage unit. Upon the measurement of the measurement object, the signals outputted from the first light receiving unit and the second light receiving unit are corrected based on the first reference data and the second reference data stored in the storage unit, such that the received light amount distributions corresponding to the portion in the measurement space excluding the measurement object out of the received light amount distributions indicated by the signals outputted from the first light receiving unit and the second light receiving unit become equal to the reference received light amount distributions.

With this, the position of the measurement object in the second direction intersecting the first direction is calculated at high accuracy based on the corrected signal outputted from the first light receiving unit. Further, whether the measurement object is in the first state, the second state, or the third state is determined at high accuracy based on the corrected signals outputted from the first light receiving unit and the second light receiving unit. Moreover, the positional displacement amount of the measurement object from the first focus is calculated at high accuracy based on at least one of the corrected signal outputted from the first light receiving unit and the corrected signal outputted from the second light receiving unit.

(6) The control unit may generate image data for displaying an image indicating the position of the measurement object in the first direction and the second direction based on the calculated position of the measurement object in the second direction and the calculated positional displacement amount of the measurement object in the first direction.

In this case, it is possible to display the image indicating the position of the measurement object in the first direction and the second direction based on the image data. With this, the user can easily and immediately recognize the position of the measurement object in the first direction and the second direction by visibly recognizing the image based on the image data.

(7) The control unit may determine, based on the calculated position of the measurement object in the second direction and the calculated positional displacement amount of the measurement object in the first direction, whether or not the measurement object is positioned within a previously defined effective measurement region, the determination being made, and generate, when the measurement object is positioned outside the effective measurement region, a notification signal indicating that the measurement object is outside the effective measurement region.

In this case, it is determined whether or not the measurement object is positioned within the previously defined effective measurement region in the first direction and the second direction. If the measurement object is not positioned within the effective measurement region, the notification signal notifies of the fact that the measurement object is outside the effective measurement region. With this, even if the position of the measurement object is outside the effective measurement region, it is possible to move the measurement object into the effective measurement region based on the notification signal.

(8) The light projecting unit may be configured to project collimated light having a prescribed width into the measurement space, the first optical system may be configured to direct the collimated light passing through the measurement space toward the first light receiving unit, the second optical system may be configured to direct the collimated light passing through the measurement space toward the second light receiving unit, the first light receiving unit may include a first image sensor having a plurality of pixels arranged along a width direction of the collimated light directed by the first optical system, the second light receiving unit may include a second image sensor having a plurality of pixels arranged along the width direction of the collimated light directed by the second optical system, and the control unit may be configured to calculate a position of an edge of the measurement object in the second direction based on the signal outputted from the first image sensor.

In this case, the collimated light having a prescribed width is projected from the light projecting unit. The collimated light passing through the measurement space is directed toward the first light receiving unit by the first optical system, and enters into the plurality of pixels of the first image sensor. The first image sensor outputs a signal indicating the received light amount. Further, the collimated light passing through the measurement space is directed toward the second light receiving unit by the second optical system, and enters into the plurality of pixels of the second image sensor. The second image sensor outputs a signal indicating the received light amount.

Based on the signals outputted from the first image sensor and the second image sensor, whether the measurement object is in the first state, the second state, or the third state is determined easily and correctly. Further, the position of the measurement object in the second direction is calculated based on the signal outputted from the first image sensor.

Moreover, the position of the edge of the measurement object in the second direction is calculated based on the signal outputted from the first image sensor. In this case, it is possible to easily improve accuracy in the measurement of the position of the edge of the measurement object by moving the measurement object to the first focus along the first direction.

(9) The second image sensor may include a plurality of pixels arranged two-dimensionally along the width direction and a thickness direction of the collimated light directed by the second optical system, and the control unit may be configured to detect an inclination of the edge of the measurement object with respect to the thickness direction of the collimated light based on the signal outputted from the second image sensor, and correct the calculated position of the edge of the measurement object based on the detected inclination.

In this case, the collimated light passing through the measurement space is directed toward the second light receiving unit by the second optical system, and enters into the two-dimensionally arranged plurality of pixels of the second image sensor. With this, the received light amount distributions of the collimated light directed toward the second light receiving unit in the width direction and the thickness direction are obtained based on the signal outputted from the second image sensor. Thus, it is possible to correctly detect the inclination of the edge of the measurement object with respect to the thickness direction of the collimated light based on the obtained received light amount distributions.

The calculated position of the edge of the measurement object is corrected based on the detected inclination. With this, it is possible to further improve accuracy in the measurement of the position of the edge of the measurement object at low cost without providing an additional configuration for obtaining the received light amount distributions of the collimated light in the width direction and the thickness direction.

(10) The optical measuring device may further include: a third light receiving unit configured to output a signal indicating a received light amount; and a third optical system configured to direct the collimated light passing through the measurement space toward the third light receiving unit, wherein the third light receiving unit may include a third image sensor having a plurality of pixels arranged two-dimensionally along the width direction and a thickness direction of the collimated light directed by the third optical system, and the control unit may be configured to detect an inclination of the edge of the measurement object with respect to the thickness direction of the collimated light based on the signal outputted from the third image sensor, and correct the calculated position of the edge of the measurement object based on the detected inclination.

In this case, the collimated light passing through the measurement space is directed toward the third light receiving unit by the third optical system, and enters into the plurality of two-dimensionally arranged pixels of the third image sensor. With this, the received light amount distributions of the collimated light directed toward the third light receiving unit in the width direction and the thickness direction are obtained based on the signal outputted from the third image sensor. It is possible to correctly detect the inclinations of the edge of the measurement object with respect to the thickness direction of the collimated light based on the obtained received light amount distribution. The calculated position of the edge of the measurement object is corrected based on the detected inclination. With this, it is possible to further improve accuracy in the measurement of the position of the edge of the measurement object with a simple configuration.

According to the present invention, it is possible to easily improve accuracy in measurement of a measurement object.

BRIEF DESCRIPTION OF THE DRAWINGS

FIG. 4 is a schematic diagram showing a focus of a second optical system corresponding to a second image sensor in FIG. 2;

DETAILED DESCRIPTION OF PREFERRED EMBODIMENTS

[1] First Embodiment (1) Configuration of Optical Measuring Device

Figure 1:
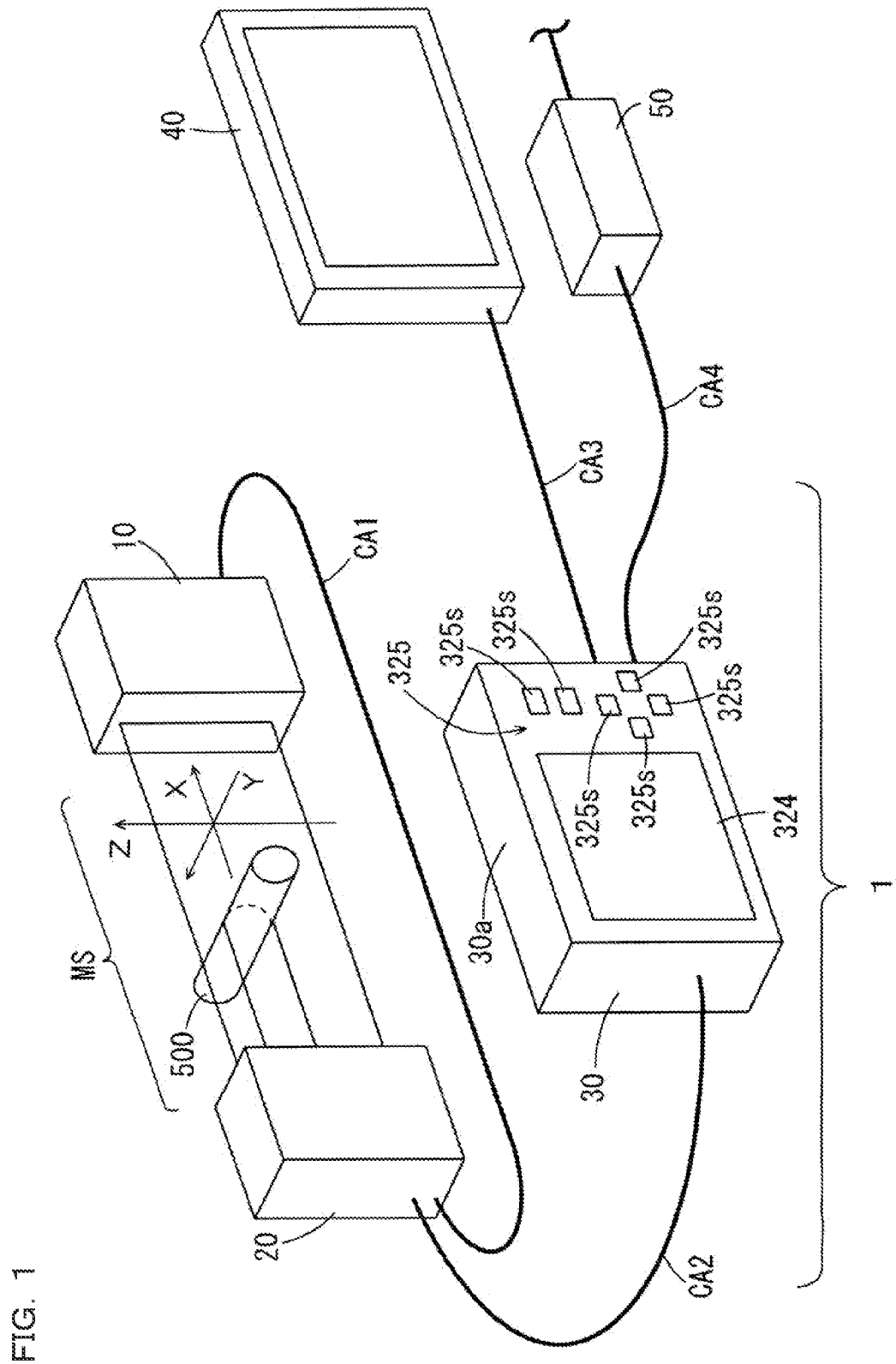
FIG. 1 is an external perspective view of an optical measuring device according to a first embodiment.

Hereinafter, an optical measuring device according to a first embodiment will be described with reference to the drawings. FIG. 1 is an external perspective view of the optical measuring device according to the first embodiment, and FIG. 2 is a block diagram showing a configuration of the optical measuring device according to the first embodiment.

An optical measuring device 1 according to the first embodiment is provided with a light projecting unit 10, a light receiving unit 20, and a controller 30. As shown in FIG. 1, the light projecting unit 10 and the light receiving unit 20 are connected to each other via a cable CA1. Further, the light receiving unit 20 and the controller 30 are connected to each other via a cable CA2. Various signals are transmitted between the light projecting unit 10, the light receiving unit 20, and the controller 30 via the cables CA1 and CA2. Further, the controller 30 is connected with a display device 40 via a cable CA3, and with a programmable controller 50 via a cable CA4. Various signals are transmitted between the controller 30 and the display device 40 via the cable CA3, and between the controller 30 and the programmable controller 50 via the cable CA4.

Figure 2:
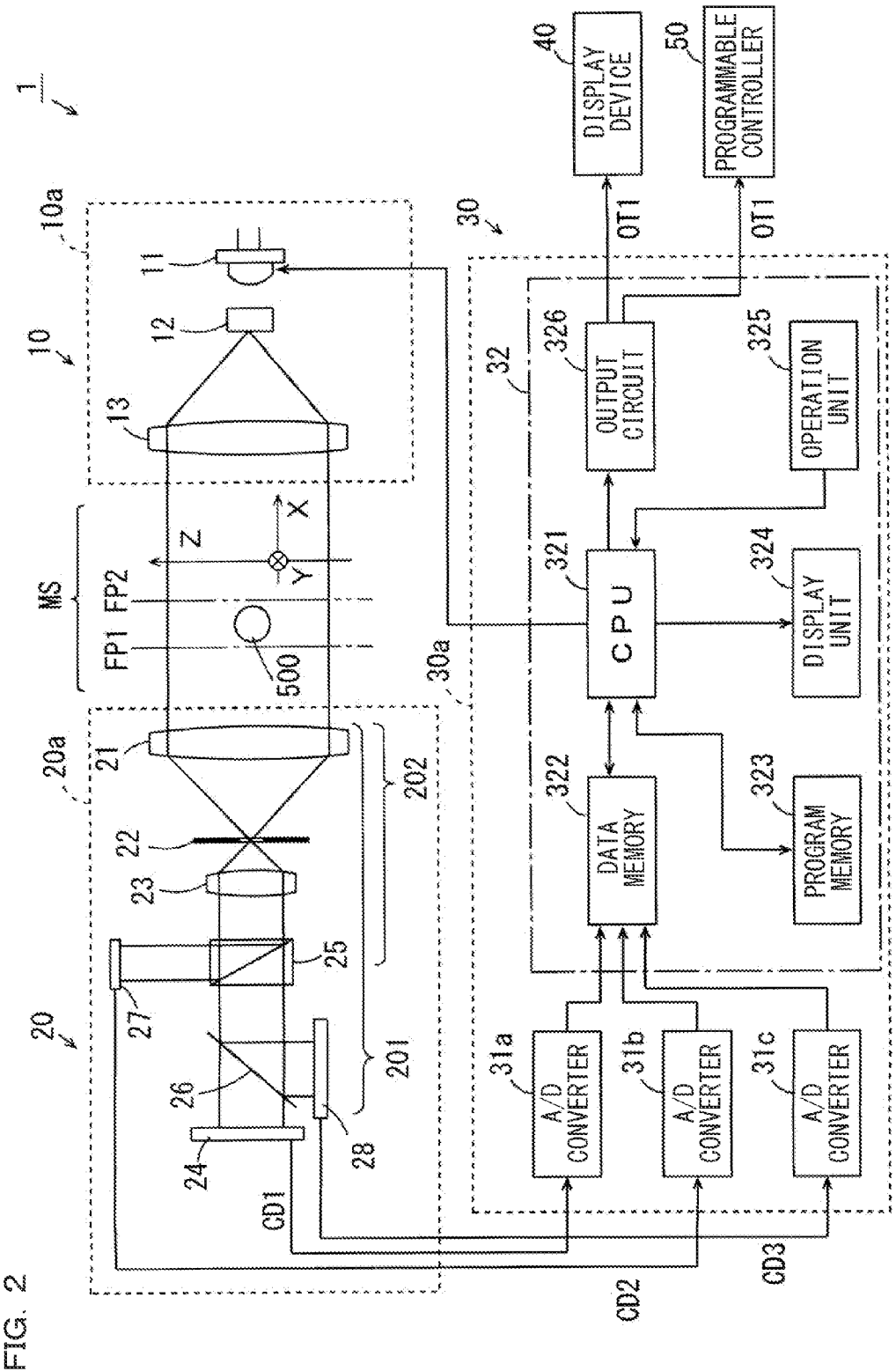
FIG. 2 is a block diagram showing a configuration of the optical measuring device according to the first embodiment.

As shown in FIG. 2, the light projecting unit 10 includes a light source 11 configured by a light-emitting diode and the like, a light diffusing unit 12, and a transmitter lens 13. The light source 11, the light diffusing unit 12, and the transmitter lens 13 are contained within a casing 10a of the light projecting unit 10.

The light receiving unit 20 includes a first lens 21, a diaphragm 22, a second lens 23, a first image sensor 24, a beam splitter 25, a half mirror 26, a second image sensor 27, and a third image sensor 28. The first lens 21, the diaphragm 22, the second lens 23, the first image sensor 24, the beam splitter 25, the half mirror 26, the second image sensor 27, and the third image sensor 28 are contained within a casing 20a.

In this embodiment, one-dimensional CCD (charge-coupled device) image sensors are used as the first image sensor 24 and the second image sensor 27. A one-dimensional CCD image sensor includes a plurality of pixels arranged in one direction. Further, a two-dimensional CCD image sensor is used as the third image sensor 28. A two-dimensional CCD image sensor includes a plurality of pixels arranged two-dimensionally.

As shown in FIG. 2, the controller 30 includes three A/D (analog/digital) converters 31a, 31b, and 31c and a signal processing unit 32. The three A/D converters 31a, 31b, and 31c and the signal processing unit 32 are contained within a casing 30a. The signal processing unit 32 includes a CPU (central processing unit) 321, a data memory 322, a program memory 323, a display unit 324, an operation unit 325, and an output circuit 326.

Light emitted from the light source 11 of the light projecting unit 10 is diffused in one direction by the light diffusing unit 12, and converted into belt-like collimated light by the transmitter lens 13. The collimated light has a prescribed width and a prescribed thickness, and is projected toward the light receiving unit 20.

In the following description, a space between the light projecting unit 10 and the light receiving unit 20 through which the collimated light passes is referred to as a measurement space MS. Further, in the following description, an X direction, a Y direction, and a Z direction that are perpendicular to each other are defined in the measurement space MS. The X direction is a direction parallel to an optical axis of the collimated light that passes through the measurement space MS, the Y direction is a direction parallel to the thickness direction of the collimated light that passes through the measurement space MS, and the Z direction is a direction parallel to the width direction of the collimated light that passes through the measurement space MS.

The collimated light projected from the light projecting unit 10 is converged by the first lens 21 of the light receiving unit 20, passes through an aperture of the diaphragm 22, and then collimated again by the second lens 23. Part of the collimated light that has been transmitted through the second lens 23 is transmitted through the beam splitter 25 and the half mirror 26, and directed toward the first image sensor 24. The first image sensor 24 is positioned such that the plurality of pixels of the first image sensor 24 are arranged along the width direction of the collimated light directed from the second lens 23.

Another part of the collimated light that has been transmitted through the second lens 23 is reflected on the beam splitter 25, and directed toward the second image sensor 27. The second image sensor 27 is positioned such that the plurality of pixels of the second image sensor 27 are arranged along the width direction of the collimated light directed from the second lens 23 and the beam splitter 25.

The remaining part of the collimated light that has been transmitted through the second lens 23 is transmitted through the beam splitter 25, reflected on the half mirror 26, and directed toward the third image sensor 28. The third image sensor 28 is positioned such that the plurality of pixels of the third image sensor 28 are arranged two-dimensionally along the width direction and the thickness direction of the collimated light directed from the second lens 23 and the half mirror 26.

In this embodiment, an optical path from the first lens 21 to the first image sensor 24 in the light receiving unit 20 constitutes a first optical system 201 corresponding to the first image sensor 24. Further, an optical path from the first lens 21 to the second image sensor 27 in the light receiving unit 20 constitutes a second optical system 202 corresponding to the second image sensor 27. The first lens 21, the diaphragm 22, and the second lens 23 that are shared in both of the first optical system 201 and the second optical system 202 constitute a double telecentric optical system.

Figure 3:
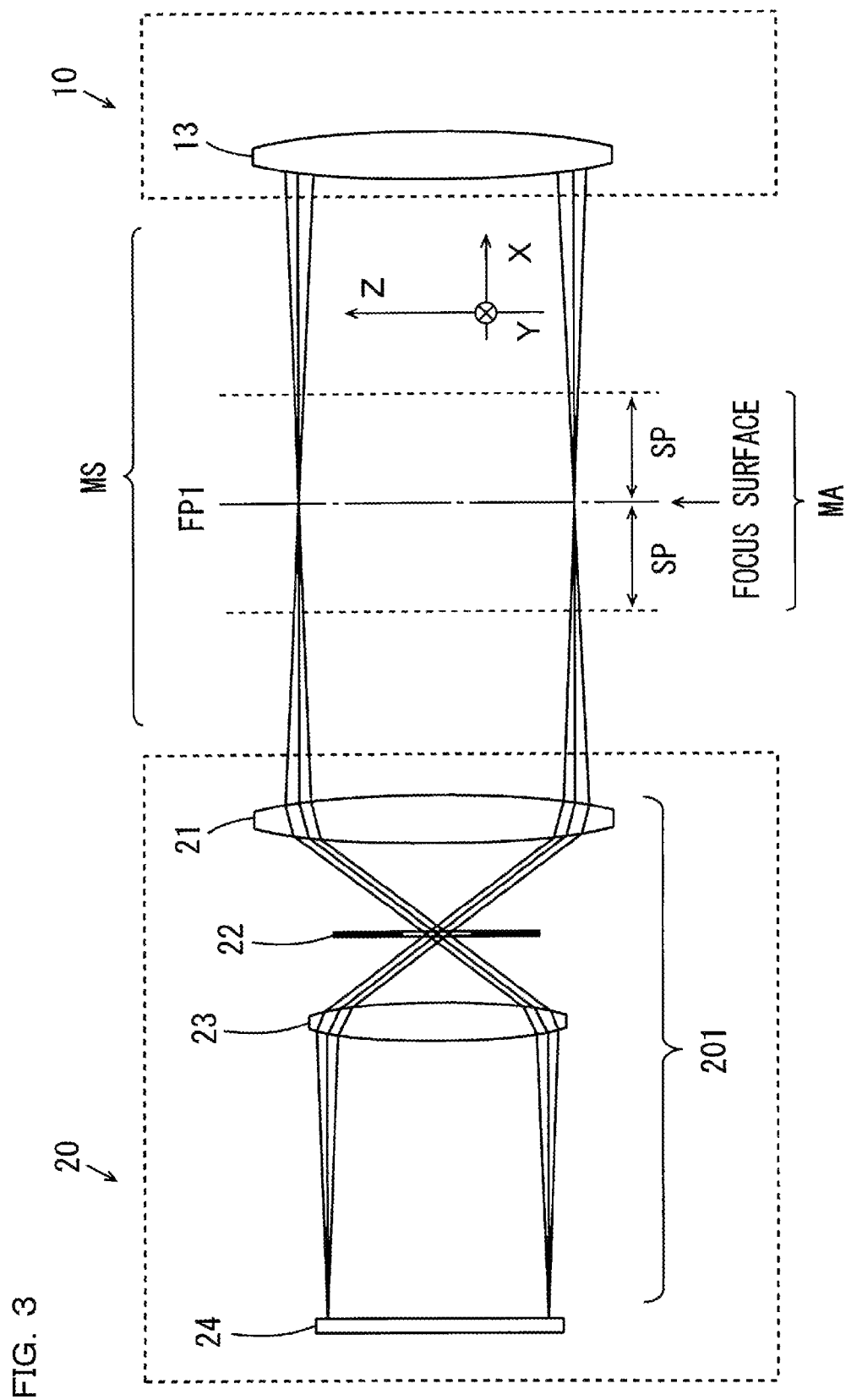
FIG. 3 is a schematic diagram showing a focus of a first optical system corresponding to a first image sensor in FIG. 2.

FIG. 3 is a schematic diagram showing a focus of the first optical system 201 corresponding to the first image sensor 24 in FIG. 2. As shown in FIG. 3, a focus surface of the first optical system 201 is positioned within the measurement space MS in this example. The focus surface of the first optical system 201 within the measurement space MS is referred to as a first focus FP1.

In this embodiment, as a range of a suitable focus depth for measuring a measurement object 500, an effective measurement region MA along the X direction is determined for the first optical system 201. In the example of FIG. 3, the effective measurement region MA is a range between a position away from the first focus FP1 by a distance sp to the light receiving unit 20 side and a position away from the first focus FP1 by the distance sp to the light projecting unit 10 side.

FIG. 4 is a schematic diagram showing a focus of the second optical system 202 corresponding to the second image sensor 27 in FIG. 2. As shown in FIG. 4, a focus surface of the second optical system 202 is positioned within the measurement space MS in this example. The focus surface of the second optical system 202 within the measurement space MS is referred to as a second focus FP2.

In the light receiving unit 20, the first image sensor 24 and the second image sensor 27 are provided within the casing 20a such that the positions of the first focus FP1 and the second focus FP2 are spaced apart from each other in the X direction within the measurement space MS, and such that the second focus FP2 is positioned closer to the light projecting unit 10 than the first focus FP1 by the distance sp.

As shown in FIG. 2, the first image sensor 24 and the second image sensor 27 respectively output analog signals CD1 and CD2 each indicating a received light amount distribution of the collimated light that has been received in the width direction. Further, the third image sensor 28 outputs an analog signal CD3 indicating received light amount distributions of the collimated light that has been received in the width direction and the thickness direction.

The A/D converter 31a of the controller 30 converts the signal CD1 outputted from the first image sensor 24 into a digital signal, and writes the digital signal in the data memory 322 as data indicating the received light amount distribution.

The A/D converter 31b of the controller 30 converts the signal CD2 outputted from the second image sensor 27 into a digital signal, and writes the digital signal in the data memory 322 as data indicating the received light amount distribution.

The A/D converter 31c of the controller 30 converts the signal CD3 outputted from the third image sensor 28 into a digital signal, and writes the digital signal in the data memory 322 as data indicating the received light amount distribution.

The program memory 323 stores a control program. The operation unit 325 includes a plurality of switches 325s (FIG. 1) provided for the casing 30a, and the switches are used for various settings of the optical measuring device 1.

The CPU 321 controls the light source 11 of the light projecting unit 10 according to the control program stored in the program memory 323, and controls a timing generator circuit and the like (not shown) incorporated in the light receiving unit 20. Further, the CPU 321 performs measurement of the measurement object 500 according to the control program. A method of measuring the measurement object 500 by the optical measuring device 1 will be described later in detail.

Moreover, the CPU 321 supplies a result of the measurement of the measurement object 500 to the output circuit 326, for example. In addition, the CPU 321 supplies image data based on the result of the measurement of the measurement object 500 to the output circuit 326, for example. The output circuit 326 outputs, as an output signal OT1, the result of the measurement, the image data, and the like supplied from the CPU 321 to devices outside the optical measuring device 1 (such as the display device 40 and the programmable controller 50 in FIGS. 1 and 2).

The display unit 324 displays, for example, various settings of the optical measuring device 1 by the operation unit 325, the result of the measurement of the measurement object 500, and the like. In addition, the display unit 324 displays an image or text indicating that the measurement object 500 is not within the effective measurement region MA based on a later-described measurement prohibiting signal supplied from the CPU 321.

(2) Method of Measuring Measurement Object

FIGS. 5A to 5C and FIGS. 6A to 6C are diagrams for explaining a method of measuring the measurement object 500 by the optical measuring device 1 according to the first embodiment. In this example, the measurement object 500 is a linear member having a circular section. According to the method described below, a distance between one edge E1 and the other edge E2 of the measurement object 500 in the Z direction is calculated. Further, positions of the one edge E1 and the other edge E2 of the measurement object 500 in the Z direction are calculated. In addition, a position of the measurement object 500 in the X direction (a position of a center 500c of the measurement object 500) is calculated.

Figure 5A:
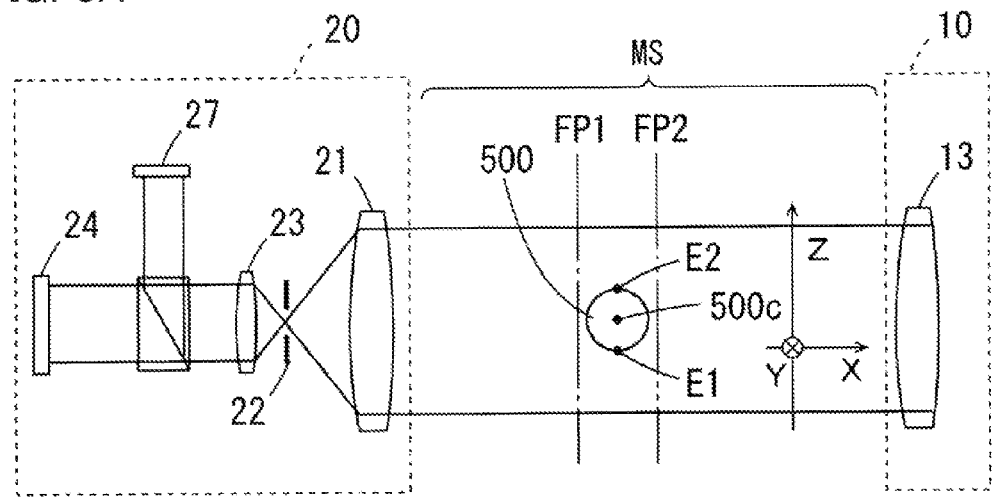
FIGS. 5A to 5C are diagrams for explaining a method of measuring a measurement object by the optical measuring device according to the first embodiment.

FIG. 5A is a schematic side view mainly showing the light projecting unit 10 and the light receiving unit 20. As shown in FIG. 5A, first, the measurement object 500 is placed within the measurement space MS between the light projecting unit 10 and the light receiving unit 20.

Then, the light receiving unit 20 is irradiated with collimated light from the light projecting unit 10. This causes the first image sensor 24 and the second image sensor 27 to respectively output the analog signals CD1 and CD2 (FIG. 2), each indicating the received light amount distribution of the collimated light in the width direction. The analog signals CD1 and CD2 are converted into digital signals by the controller 30.

Figure 5B:
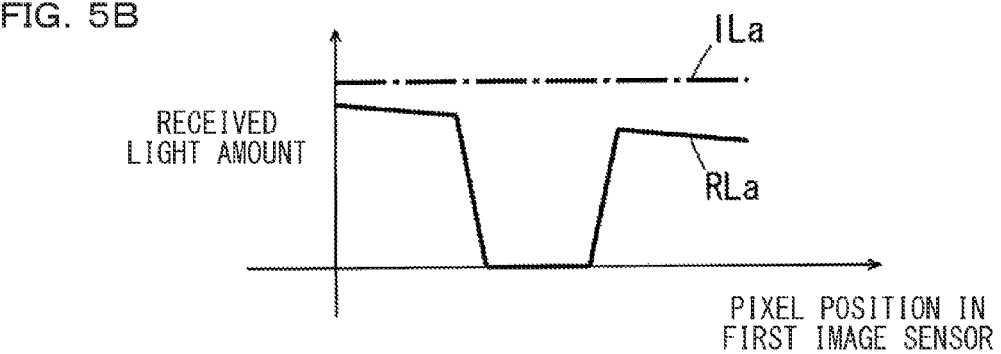

FIG. 5B shows a received light amount distribution RLa based on the signal outputted from the first image sensor 24. In FIG. 5B, the vertical axis indicates the received light intensities of light entering into the pixels in the first image sensor 24, and the horizontal axis indicates positions of the plurality of pixels in the first image sensor 24.

As shown in FIG. 5B, the received light amount of the plurality of pixels in the first image sensor 24 corresponding to a portion where the measurement object 500 is present in the Z direction is substantially 0 in this example. On the other hand, the received light amount of the pixels in the first image sensor 24 corresponding to a portion where the measurement object 500 is absent in the Z direction is greater than 0. Therefore, the received light amount distribution greatly changes between the pixels in the first image sensor 24 corresponding to the one edge E1 and the other edge E2 of the measurement object 500 and the pixels near these pixels in the Z direction.

The received light amount distribution RLa shown in FIG. 5B is stored in the data memory 322 of FIG. 2. Similarly, the received light amount distribution based on the signal outputted from the second image sensor 27 is stored in the data memory 322 of FIG. 2.

In a case where intensity of light produced from the light source 11 is constant, if any of the light diffusing unit 12 (FIG. 2), the transmitter lens 13 (FIG. 2), the first optical system 201, and the second optical system 202 becomes tarnished or dirty, the magnitude of the amount of the light received by the first image sensor 24 and the second image sensor 27 decreases. If the amount of the received light becomes smaller than the amount originally expected, accuracy in the measurement of the measurement object 500 decreases.

Therefore, in this embodiment, the received light amount distributions corresponding respectively to the signals outputted from the first image sensor 24 and the second image sensor 27 are respectively corrected to be equal to the received light amount distributions obtained when the light diffusing unit 12, the transmitter lens 13, the first optical system 201, and the second optical system 202 are not tarnished nor dirty.

The following describes the correction of the received light amount distribution RLa of FIG. 5B. In order to correct the received light amount distribution RLa, first reference data is previously stored in the data memory 322. The first reference data indicates the received light amount distribution to be obtained by the first image sensor 24 in a state in which the light diffusing unit 12, the transmitter lens 13, the first optical system 201, and the second optical system 202 are not tarnished nor dirty, and in which the measurement object 500 is absent within the measurement space MS. In FIG. 5B, a received light amount distribution ILa of the first reference data is indicated by a heavy dashed-dotted line.

First, the CPU 321 differentiates the received light amount distribution RLa to generate a differentiated waveform DLa corresponding to the received light amount distribution RLa of the first image sensor 24.

Figure 5C:
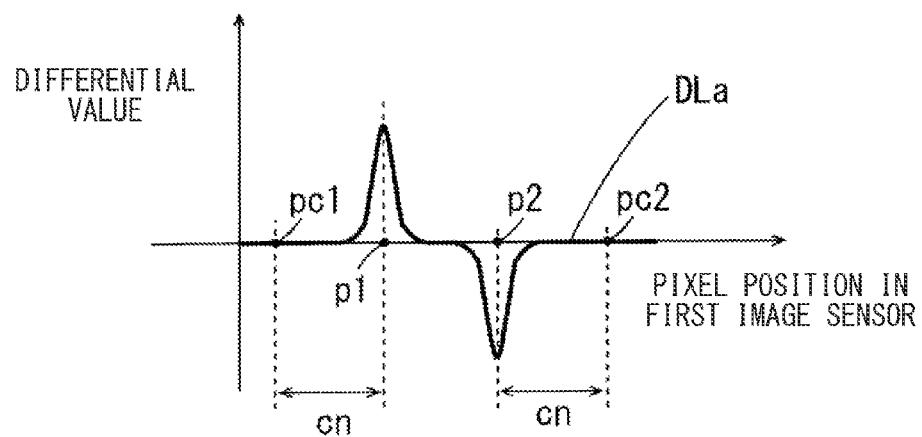

FIG. 5C shows the differentiated waveform DLa corresponding to the received light amount distribution RLa of FIG. 5B. In FIG. 5C, the vertical axis indicates differential values, and the horizontal axis indicates positions of the plurality of pixels in the first image sensor 24.

As shown in FIG. 5C, in the differentiated waveform DLa, the differential value is maximized or minimized at a portion where the magnitude of the change in the received light amount is large in the received light amount distribution RLa.

In this example, a pixel position where the differential value is maximum in the differentiated waveform DLa is indicated by a reference symbol p1, and a pixel position where the differential value is minimum in the differentiated waveform DLa is indicated by a reference symbol p2. In this case, the pixel position p1 indicates a pixel position corresponding to the one edge E1 of the measurement object 500 in the Z direction. By contrast, the pixel position p2 indicates a pixel position corresponding to the other edge E2 of the measurement object 500 in the Z direction.

When correcting the received light amount distribution RLa, it is difficult to obtain an accurate correction amount for each pixel using the received light amount distribution of a portion corresponding to the portion where the measurement object 500 is present in the Z direction. Thus, in this example, a position spaced apart from the pixel position p1 corresponding to the one edge E1 by a certain number of pixels cn toward a side opposite to the pixel position p2 corresponding to the other edge E2 of the measurement object 500 is determined to be a correcting pixel position pc1 for the received light amount distribution RLa. Similarly, a position spaced apart from the pixel position p2 corresponding to the other edge E2 by the certain number of pixels cn toward a side opposite to the pixel position p1 corresponding to the one edge E1 of the measurement object 500 is determined to be a correcting pixel position pc2 for the received light amount distribution RLa.

Figure 6A:
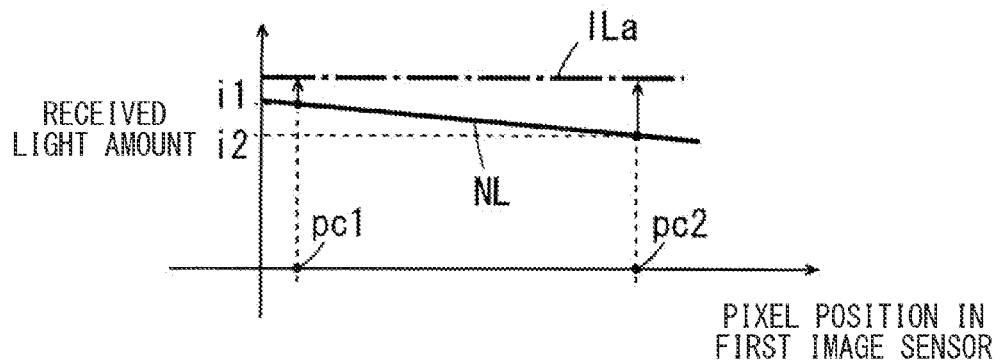
FIGS. 6A to 6C are diagrams for explaining the method of measuring the measurement object by the optical measuring device according to the first embodiment.

Then, as shown in FIG. 6A, the CPU 321 estimates a received light amount distribution NL that is obtained in the state in which the measurement object 500 is absent within the measurement space MS based on received light intensities i1 and i2 at the two determined correcting pixel positions pc1 and pc2.

Figure 6B:
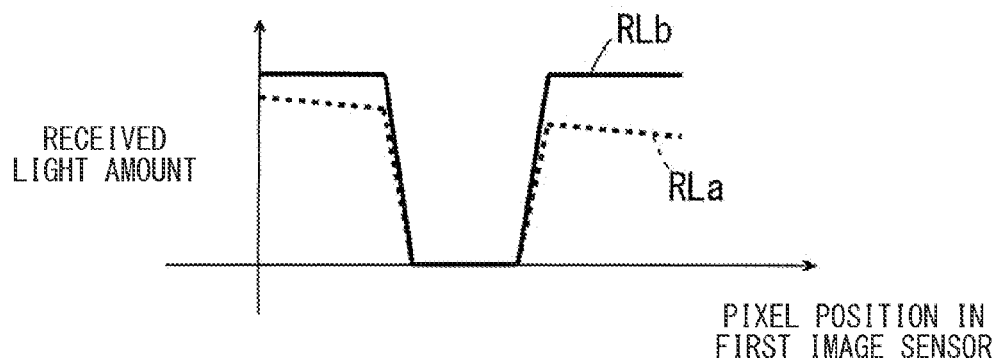

Subsequently, the CPU 321 calculates a correction amount for each pixel for making the estimated received light amount distribution NL be equal to the received light amount distribution ILa of the first reference data. The CPU 321 corrects the received light amount distribution RLa based on the calculated correction amount for each pixel. In FIG. 6B, the received light amount distribution RLa before the correction is shown in a heavy dashed line and a received light amount distribution RLb after the correction is shown in a heavy solid line. The received light amount distribution RLb after the correction is stored in the data memory 322.

Similarly to the correction of the received light amount distribution RLa based on the signal outputted from the first image sensor 24, the received light amount distribution based on the signal outputted from the second image sensor 27 is corrected. In this case, similarly to the correction of the received light amount distribution RLa based on the signal outputted from the first image sensor 24, second reference data is previously stored in the data memory 322. The second reference data indicates the received light amount distribution to be obtained by the second image sensor 27 in a state in which the light diffusing unit 12, the transmitter lens 13, the first optical system 201, and the second optical system 202 are not tarnished nor dirty, and in which the measurement object 500 is absent within the measurement space MS.

The CPU 321 determines two correcting pixel positions by differentiating the received light amount distribution corresponding to the second image sensor 27, and estimates a received light amount distribution that is obtained in the state in which the measurement object 500 is absent within the measurement space MS based on the received light intensities at the two determined correcting pixel positions.

Subsequently, the CPU 321 calculates a correction amount for each pixel for making the estimated received light amount distribution be equal to the received light amount distribution of the second reference data. The CPU 321 corrects the received light amount distribution based on the calculated correction amount for each pixel. The received light amount distribution after the correction is stored in the data memory 322.

Figure 6C:
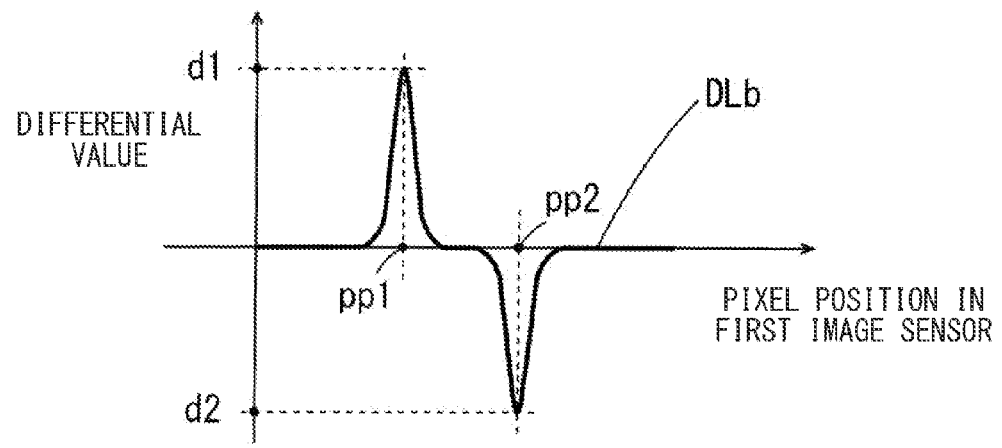

Then, the CPU 321 differentiates the two received light amount distributions after the correction to generate two differentiated waveforms respectively corresponding to the two received light amount distributions. FIG. 6C shows a differentiated waveform DLb generated by differentiating the received light amount distribution RLb after the correction in FIG. 6B. In FIG. 6C, the vertical axis indicates differential values, and the horizontal axis indicates positions of the plurality of pixels in the first image sensor 24.

As shown in FIG. 6C, in the differentiated waveform DLb, the differential value is maximized or minimized at a portion where the magnitude of the change in the received light amount is large in the received light amount distribution RLb in FIG. 6B.

The CPU 321 stores a maximum value d1 and a minimum value d2 in the generated differentiated waveform DLb in the data memory 322 respectively as a first maximum value and a first minimum value. Further, the CPU 321 stores pixel positions for the maximum value d1 and the minimum value d2 in the differentiated waveform DLb in the data memory 322 respectively as a first maximum pixel position pp1 and a first minimum pixel position pp2.

In this case, the first maximum pixel position pp1 corresponds to the position of the edge E1 of the measurement object 500 in the Z direction, and the first minimum pixel position pp2 corresponds to the position of the edge E2 of the measurement object 500 in the Z direction. Therefore, the CPU 321 calculates the positions of the one edge E1 and the other edge E2 of the measurement object 500 in the Z direction based on the first maximum pixel position pp1 and the first minimum pixel position pp2 stored in the data memory 322. Further, the CPU 321 calculates a distance between the one edge E1 and the other edge E2 of the measurement object 500 in the Z direction. Results of the calculation of the positions of the edges E1 and E2 and the distance between the edges E1 and E2 in the Z direction are stored in the data memory 322.

The CPU 321 generates image data or text data based on the results of the calculation of the positions of the edges E1 and E2 and the distance between the edges E1 and E2 that have been stored in the data memory 322, and supplies the generated data to the display unit 324. Thus, the results of the calculation of the positions of the edges E1 and E2 and the distance between the edges E1 and E2 are displayed in the display unit 324.

Similarly, in the differentiated waveform generated corresponding to the second image sensor 27, the differential value is maximized or minimized at a portion where the magnitude of the change in the received light amount distribution after the correction is large. With this, the CPU 321 stores a maximum value and a minimum value in the generated differentiated waveform in the data memory 322 respectively as a second maximum value and a second minimum value. Further, the CPU 321 stores pixel positions for the maximum value and the minimum value in the differentiated waveform corresponding to the second image sensor 27 in the data memory 322 respectively as a second maximum pixel position and a second minimum pixel position.

Here, absolute values of the first maximum value d1 and the first minimum value d2 of the differentiated waveform DLb generated corresponding to the first image sensor 24 increase as the measurement object 500 becomes closer to the first focus FP1 in the X direction, and decreases as the measurement object 500 becomes distant from the first focus FP1 in the X direction. Therefore, in this embodiment, an average value of a sum of the absolute value of the first maximum value and the absolute value of the first minimum value is calculated by the CPU 321 as a first evaluation value corresponding to an amount of positional displacement of the measurement object 500 from the first focus FP1.

Further, absolute values of the second maximum value and the second minimum value of the differentiated waveform generated corresponding to the second image sensor 27 increase as the measurement object 500 becomes closer to the second focus FP2 in the X direction, and decrease as the measurement object 500 becomes distant from the second focus FP2 in the X direction. Therefore, in this embodiment, an average value of a sum of the absolute value of the second maximum value and the absolute value of the second minimum value is calculated by the CPU 321 as a second evaluation value corresponding to an amount of positional displacement of the measurement object 500 from the second focus FP2.

Moreover, in this embodiment, a predetermined relation between the position of the measurement object 500 in the X direction and the first evaluation value is stored in the data memory 322 of FIG. 2 as a first relation, and a predetermined relation between the position of the measurement object 500 in the X direction and the second evaluation value is stored in the data memory 322 of FIG. 2 as a second relation.

The first relation may be generated by calculating the first evaluation value for each of a plurality of positions in the X direction while moving the measurement object 500 within the measurement space MS along the X direction, for example. Similarly, the second relation may be generated by calculating the second evaluation value for each of a plurality of positions in the X direction while moving the measurement object 500 within the measurement space MS along the X direction, for example.

In the first relation, the magnitude of the first evaluation value is maximized at the position of the first focus FP1, and decreases at an exponential rate as being distant from the position of the first focus FP1. In the second relation, the magnitude of the second evaluation value is maximized at the position of the second focus FP2, and decreases at an exponential rate as being distant from the position of the second focus FP2, for example.

Figure 7:
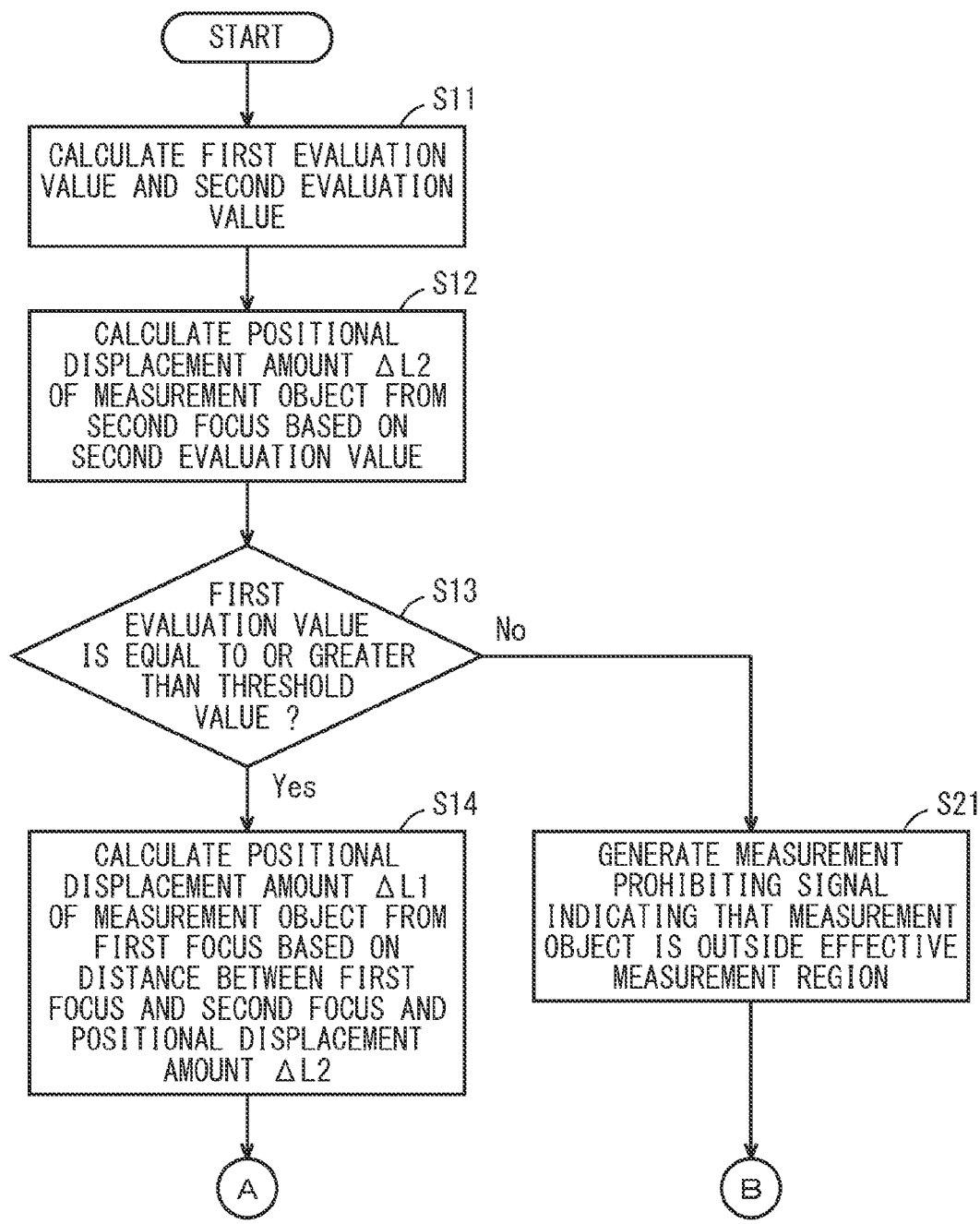
FIG. 7 is a flowchart showing steps of calculating a position of the measurement object in an X direction.
Figure 8:
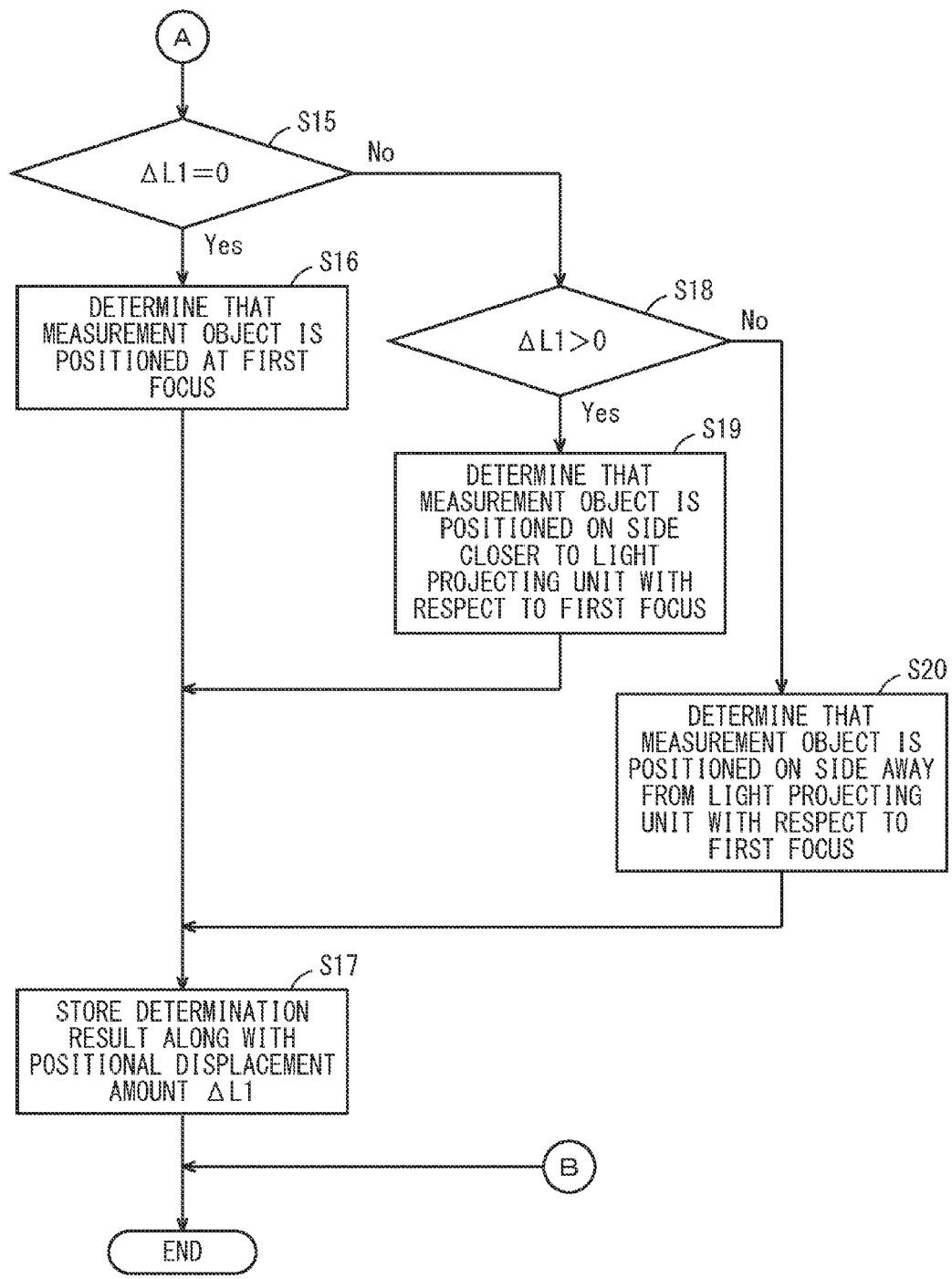
FIG. 8 is a flowchart showing steps of calculating the position of the measurement object in the X direction.

FIGS. 7 and 8 are flowcharts showing steps of calculating the position of the measurement object 500 in the X direction. The CPU 321 calculates the position of the measurement object 500 in the X direction in the following manner.

First, as described above, the CPU 321 calculates the first evaluation value based on the signal outputted from the first image sensor 24, and calculates the second evaluation value based on the signal outputted from the second image sensor 27 (step S11).

Next, the CPU 321 calculates a positional displacement amount ΔL2 of the measurement object 500 from the second focus FP2 based on the calculated second evaluation value and the second relation stored in the data memory 322 (step S12).

In step S12, it is not known whether the measurement object 500 is positioned on the side closer to the light projecting unit 10 with respect to the second focus FP2, or on the side away from the light projecting unit 10 with respect to the second focus FP2.

As described above, in the first relation, the first evaluation value is maximized at the position of the first focus FP1, and decreases at an exponential rate as being distant from the position of the first focus FP1. Accordingly, when the measurement object 500 is positioned within the effective measurement region MA, the first evaluation value becomes equal to or greater than a predetermined threshold value. Further, in this example, the distance sp between the first focus FP1 and the second focus FP2 is known, and the second focus FP2 is positioned at one end of the effective measurement region MA. Accordingly, when the measurement object 500 is positioned at the second focus FP2, the first evaluation value becomes equal to the predetermined threshold value.

Therefore, in this embodiment, a threshold value TH for the first evaluation value is previously stored in the data memory 322. With this, after step S12, the CPU 321 determines whether or not the first evaluation value is equal to or greater than the threshold value (step S13).

If the first evaluation value is equal to or greater than the threshold value TH, it is determined that the measurement object 500 is positioned within the effective measurement region MA, that is, the measurement object 500 is positioned on the side away from the light projecting unit 10 with respect to the second focus FP2 or that the measurement object 500 is positioned at the second focus FP2. On the other hand, if the first evaluation value is smaller than the threshold value TH, it is determined that the measurement object 500 is positioned outside the effective measurement region MA, that is, the measurement object 500 is positioned on the side closer to the light projecting unit 10 with respect to the second focus FP2.

With this, when the first evaluation value is equal to or greater than the threshold value TH, the CPU 321 calculates a positional displacement amount $\Delta L1$ of the measurement object 500 from the first focus FP1 based on the distance sp between the first focus FP1 and the second focus FP2 and the positional displacement amount $\Delta L2$ (step S14).

When the positional displacement amount of the measurement object 500 from the first focus FP1, the positional displacement amount of the measurement object 500 from the second focus FP2, and the distance between the first focus FP1 and the second focus FP2 are respectively represented by $\Delta L1$, $\Delta L2$, and sp, the positional displacement amount $\Delta L1$ of the measurement object 500 from the first focus FP1 is calculated based on the following equation (1).

$$\Delta L1 = sp - \Delta L2 \quad (1)$$

Subsequently, the CPU 321 determines whether or not the calculated positional displacement amount $\Delta L1$ of the measurement object 500 from the first focus FP1 is 0 (step S15).

If the positional displacement amount $\Delta L1$ is 0, the CPU 321 determines that the measurement object 500 is positioned at the first focus FP1 (step S16), and stores a result of the determination in the data memory 322 (step S17).

If the positional displacement amount $\Delta L1$ is not 0, the CPU 321 determines whether or not the positional displacement amount $\Delta L1$ of the measurement object 500 from the first focus FP1 is greater than 0 (step S18).

If the positional displacement amount $\Delta L1$ is greater than 0, the CPU 321 determines that the measurement object 500 is positioned on the side closer to the light projecting unit 10 with respect to the first focus FP1 (step S19), and stores a result of the determination in the data memory 322 along with the positional displacement amount $\Delta L1$ (step S17).

On the other hand, if the positional displacement amount $\Delta L1$ is smaller than 0, the CPU 321 determines that the measurement object 500 is positioned on the side away from the light projecting unit 10 with respect to the first focus FP1 (step S20), and stores a result of the determination in the data memory 322 along with the positional displacement amount $\Delta L1$ (step S17).

In this manner, the positional displacement amount $\Delta L1$ of the measurement object 500 from the first focus FP1 is calculated when the measurement object 500 is positioned within the effective measurement region MA. Further, it is determined whether the measurement object 500 is positioned at the first focus FP1, on the side closer to the light projecting unit 10 with respect to the first focus FP1, or on the side away from the light projecting unit 10 with respect to the first focus FP1.

The CPU 321 generates image data or text data based on the positional displacement amount $\Delta L1$ and the result of the determination of the position of the measurement object 500 with respect to the first focus FP1 that have been stored in the data memory 322, and supplies the generated data to the display unit 324. With this, the positional displacement amount $\Delta L1$ and the result of the determination of the position of the measurement object 500 with respect to the first focus FP1 are displayed in the display unit 324.

In step S13, if the first evaluation value is smaller than the threshold value TH, the measurement object 500 is outside the effective measurement region MA. This causes the CPU 321 to generate a measurement prohibiting signal indicating that the measurement object 500 is outside the effective measurement region MA (step S21). The CPU 321 supplies the generated measurement prohibiting signal to the display unit 324. With this, the display unit 324 displays image or text indicating that the measurement object 500 is outside the effective measurement region MA.

Figure 9A:
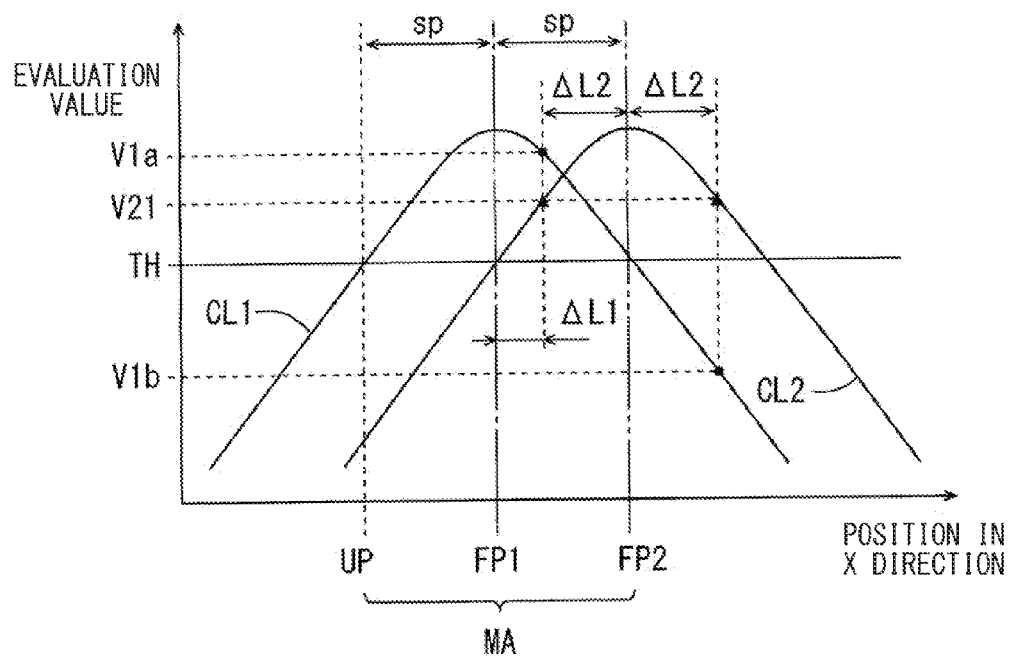
FIG. 9A is a graph for explaining an example of the calculation of the position of the measurement object based on the flowcharts in FIGS. 7 and 8.
Figure 9B:
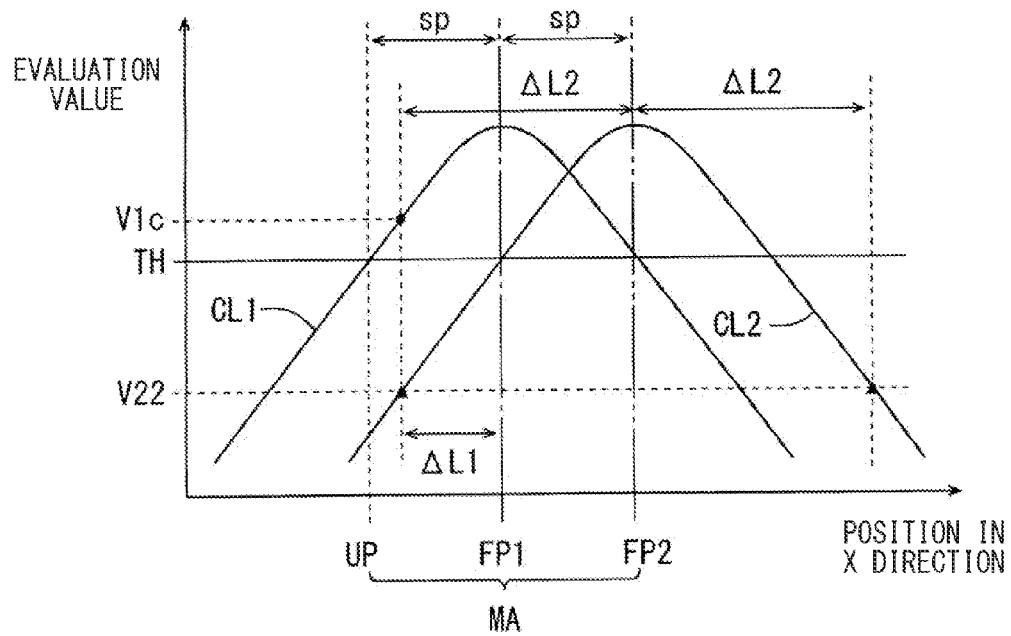
FIG. 9B is a graph for explaining another example of the calculation of the position of the measurement object based on the flowcharts in FIGS. 7 and 8.

FIG. 9A is a graph for explaining an example of the calculation of the position of the measurement object 500 based on the flowcharts in FIGS. 7 and 8, and FIG. 9B is a graph for explaining another example of the calculation of the position of the measurement object 500 based on the flowcharts in FIGS. 7 and 8. In FIGS. 9A and 9B, the vertical axis indicates the evaluation values, and the horizontal axis indicates the positions within the measurement space MS in the X direction. Further, a curved line CL1 indicates the first relation stored in the data memory 322, and a curved line CL2 indicates the second relation stored in the data memory 322. Moreover, in FIGS. 9A and 9B, the first focus FP1 is shown in the center of the effective measurement region MA, and the second focus FP2 is shown on one end of the effective measurement region MA. In addition, the other end of the effective measurement region MA is denoted by a reference symbol UP.

As shown in FIG. 9A, a case where the calculated second evaluation value is a value V21 that is greater than the threshold value TH and smaller than a maximum value of the curved line CL2 is assumed, for example. In this case, the CPU 321 calculates the positional displacement amount $\Delta L2$ of the measurement object 500 from the second focus FP2 based on the calculated value V21 and the curved line CL2.

Then, the CPU 321 determines whether or not the calculated first evaluation value is greater than the threshold value TH, in order to determine whether or not the measurement object 500 is on the side away from the light projecting unit 10 with respect to the second focus FP2, that is, on the side of the effective measurement region MA.

If the first evaluation value is a value V1a that is greater than the threshold value TH, the CPU 321 determines that the measurement object 500 is positioned within the effective measurement region MA, that is, the measurement object 500 is positioned on the side away from the light projecting unit 10 with respect to the second focus FP2.

Therefore, the CPU 321 calculates the positional displacement amount ΔL1 of the measurement object 500 from the first focus FP1 based on the equation (1). In the example of FIG. 9A, the positional displacement amount ΔL1 of the measurement object 500 from the first focus FP1 is greater than 0. As a result, when the second evaluation value is the value V21 and the first evaluation value is the value V1a greater than the threshold value TH, it can be seen that the measurement object 500 is displaced toward the side closer to the light projecting unit 10 with respect to the first focus FP1 by ΔL1.

On the other hand, in the example of FIG. 9A, when the first evaluation value is a value V1b smaller than the threshold value TH, it can be seen that the measurement object 500 is positioned outside the effective measurement region MA.

As shown in FIG. 9B, a case where the calculated second evaluation value is a value V22 smaller than the threshold value TH is assumed, for example. In this case, the CPU 321 calculates the positional displacement amount ΔL2 of the measurement object 500 from the second focus FP2 based on the calculated value V22 and the curved line CL2.

Then, the CPU 321 determines whether or not the calculated first evaluation value is greater than the threshold value TH, in order to determine whether or not the measurement object 500 is on the side away from the light projecting unit 10 with respect to the second focus FP2, that is, on the side of the effective measurement region MA.

If the first evaluation value is a value V1c that is greater than the threshold value TH, the CPU 321 determines that the measurement object 500 is positioned within the effective measurement region MA, that is, the measurement object 500 is positioned on the side away from the light projecting unit 10 with respect to the second focus FP2.

Therefore, the CPU 321 calculates the positional displacement amount ΔL1 of the measurement object 500 from the first focus FP1 based on the equation (1). In the example of FIG. 9B, the positional displacement amount ΔL1 of the measurement object 500 from the first focus FP1 is smaller than 0. As a result, when the second evaluation value is the value V22 and the first evaluation value is the value V1c greater than the threshold value TH, it can be seen that the measurement object 500 is displaced toward the side away from the light projecting unit 10 with respect to the first focus FP1 by ΔL1.

Also in the example of FIG. 9B, when the first evaluation value is a value smaller than the threshold value TH, it can be seen that the measurement object 500 is positioned outside the effective measurement region MA.

(3) Example of Display of Position of Measurement Object

As described above, the display unit 324 shown in FIGS. 1 and 2 displays the positions of the edges E1 and E2 in the Z direction, the distance between the edges E1 and E2, and the positional displacement amount ΔL1 of the measurement object 500 from the first focus FP1 which have been calculated by the measurement of the measurement object 500, the determination result of the position of the measurement object 500 with respect to the first focus FP1, and the like. Further, the display unit 324 displays the received light amount distribution indicated by the signal outputted from the third image sensor 28 shown in FIG. 2.

Figure 10:
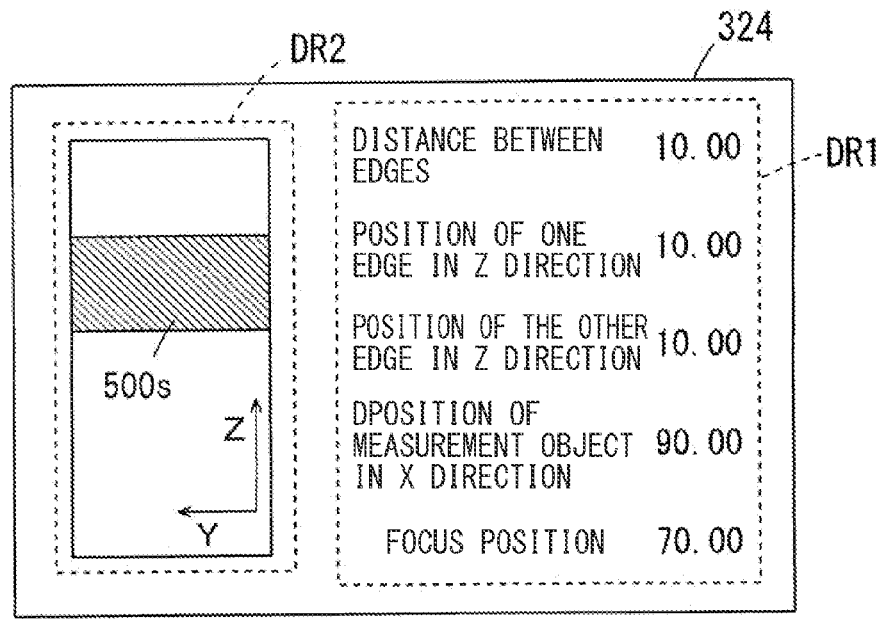
FIG. 10 shows an example of a display in a display unit in FIGS. 1 and 2 when measuring the measurement object.

FIG. 10 shows an example of the display in the display unit 324 in FIGS. 1 and 2 when measuring the measurement object 500. In the example shown in FIG. 10, two display regions DR1 and DR2 are displayed on a screen 324d of the display unit 324.

The one display region DR1 displays the distance between the edges E1 and E2 of the measurement object 500, the positions of the edges E1 and E2 in the Z direction, the position of the measurement object 500 in the X direction, and the position of the first focus FP1, for example. Further, the other display region DR2 displays the received light amount distribution indicated by the signal outputted from the third image sensor 28, for example. In the example shown in FIG. 10, a portion 500s of the received light amount distribution corresponding to the measurement object 500 is hatched.

The CPU 321 generates image data for displaying the position of the measurement object 500 in the X direction and the Z direction based on the calculation results of the positions of the edges E1 and E2 in the Z direction and the position of the measurement object 500 in the X direction. Further, the CPU 321 supplies the generated image data to the display device 40 through the output circuit 326, for example.

Figure 11:
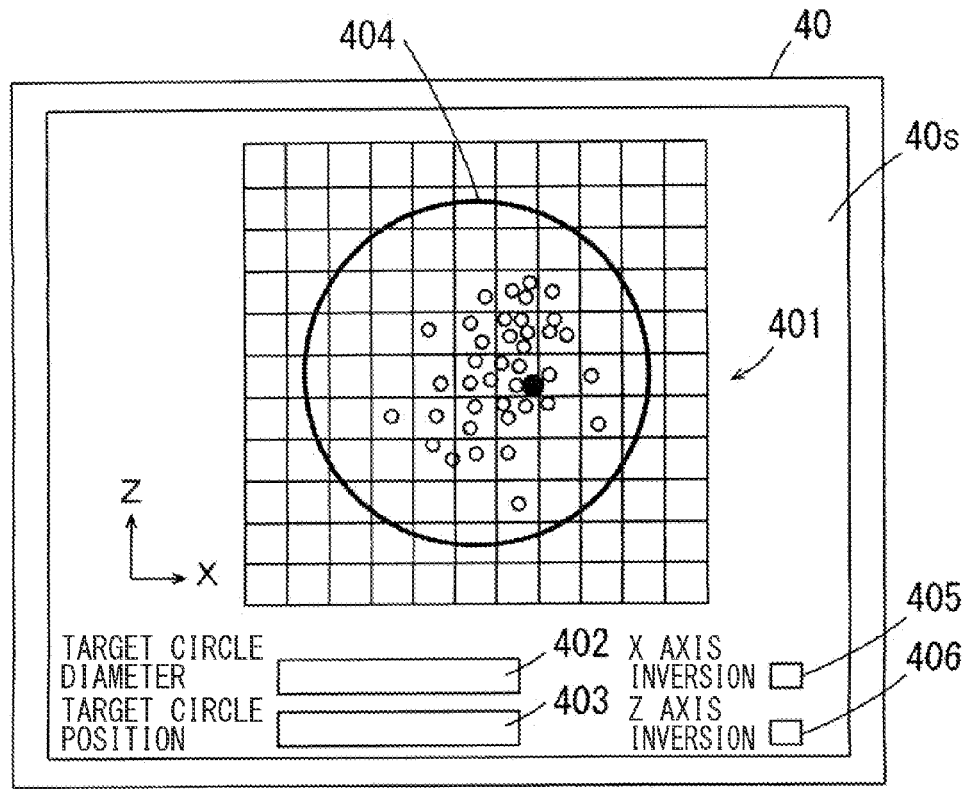
FIG. 11 shows an example of an image displayed on a screen of the display unit based on image data generated by a CPU in FIG. 2.

FIG. 11 shows an example of an image displayed on a screen of the display device 40 based on the image data generated by the CPU 321 in FIG. 2. In the example shown in FIG. 11, an XZ-plane image 401 indicating the position of the measurement object 500 in the X direction and the Z direction is displayed substantially in the center of a screen 40s of the display device 40. In the XZ-plane image 401, the current position of the measurement object 500 is indicated by a black circle, and the history of the position of the measurement object 500 is indicated by white circles. Further, a target circle 404 indicating a region within which the measurement object 500 is to be positioned is shown in the XZ-plane image 401.

As shown in FIG. 11, if the display device 40 includes an operation unit such as a keyboard, input spaces 402 and 403 for respectively setting the diameter and the position of the target circle 404 may be displayed on the screen 40s. Further, invert buttons 405 and 406 for inverting the XZ-plane image 401 with respect to an axis along the X direction and an axis along the Z direction, respectively, may be displayed on the screen 40s.

(4) Example of Application of Optical Measuring Device

Figure 12:
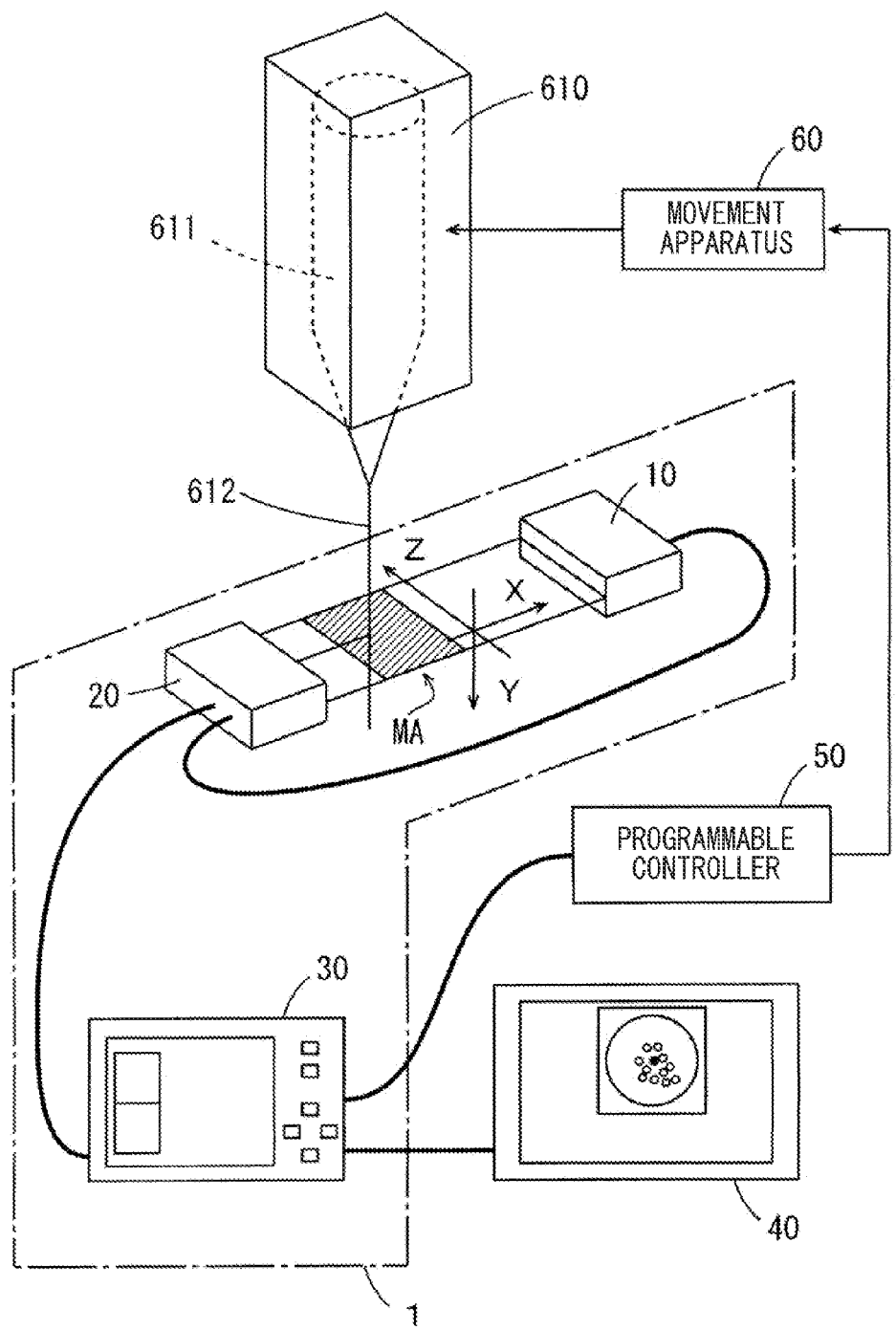
FIG. 12 is a schematic diagram showing an example of application of the optical measuring device according to the first embodiment.

The optical measuring device 1 according to this embodiment may be applied to a drawing apparatus for an optical fiber, for example. FIG. 12 is a schematic diagram showing an example of the application of the optical measuring device 1 according to the first embodiment.

As shown in FIG. 12, in an optical fiber drawing apparatus, an optical fiber 612 is produced by heating a base material 611 of the optical fiber in a heating furnace 610, and consecutively rolling up molten glass. In the step of rolling up the optical fiber 612, an outer diameter of the optical fiber 612 is measured.

Therefore, in this example, the light projecting unit 10 and the light receiving unit 20 of the optical measuring device 1 are positioned below the base material 611 of the optical fiber. At this time, in order to measure the outer diameter of the optical fiber 612 at high accuracy, it is necessary that the optical fiber 612 extending downward from the base material 611 is directed correctly within the effective measurement region MA between the light projecting unit 10 and the light receiving unit 20.

In this case, for example, the calculation results of the positions of the edges E1 and E2 of the optical fiber 612 in the Z direction and the position of the optical fiber 612 in the X direction may be supplied from the controller 30 to the programmable controller 50.

With this, the programmable controller 50 may move the heating furnace 610 or the base material 611 so that the optical fiber 612 is always guided into the effective measurement region MA by controlling a movement apparatus 60 based on the supplied calculation result. In the example of FIG. 12, the movement apparatus 60 moves the heating furnace 610 or the base material 611. However, the movement apparatus 60 may move a roll-up apparatus (not shown) of the optical fiber 612, instead of the heating furnace 610 or the base material 611.

(5) Inclination Correction

Figure 13A:
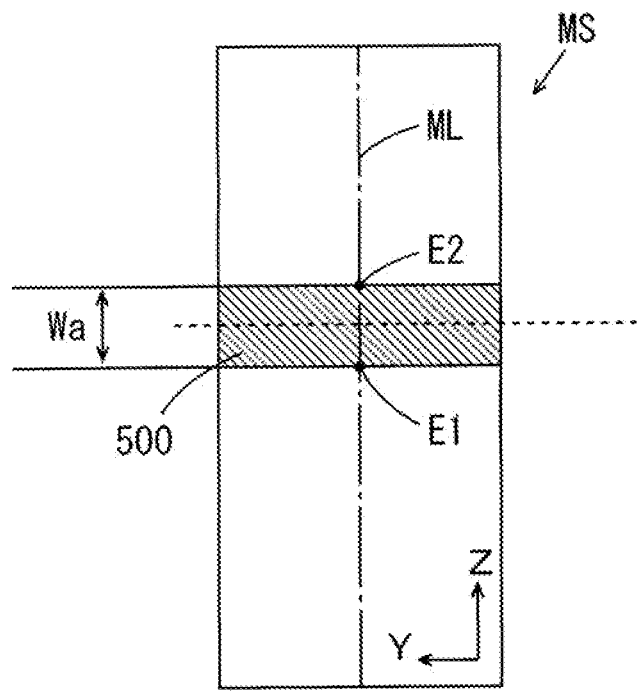
FIG. 13A shows an example in which a measurement space is viewed from a position of a light receiving unit when measuring the measurement object that is a linear member having a circular section.
Figure 13B:
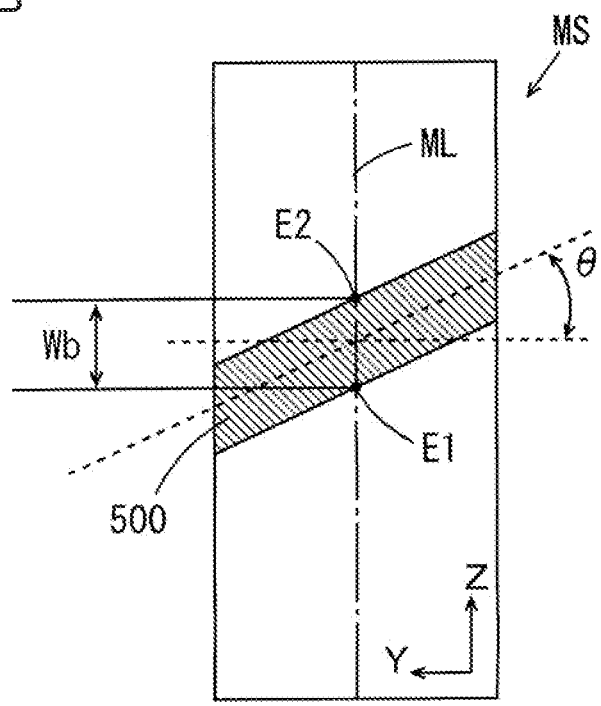
FIG. 13B shows another example in which the measurement space is viewed from the position of the light receiving unit when measuring the measurement object that is a linear member having a circular section.

FIG. 13A shows an example in which the measurement space MS is viewed from the position of the light receiving unit 20 when measuring the measurement object 500 that is a linear member having a circular section, and FIG. 13B shows another example in which the measurement space MS is viewed from the position of the light receiving unit 20 when measuring the measurement object 500 that is a linear member having a circular section.

In FIGS. 13A and 13B, the Y direction and the Z direction in the measurement space MS are indicated by arrows. Further, a dashed-dotted line ML represents a portion corresponding to a plurality of pixel positions aligned in a line in the first image sensor 24 and the second image sensor 27. Moreover, the measurement object 500 is shown by hatching.

As shown in FIG. 13A, the measurement object 500 is placed within the measurement space MS in a state in which an axial center of the measurement object 500 is parallel to the Y direction, for example. With this, a distance Wa between the one edge E1 and the other edge E2 of the measurement object 500 positioned along the dashed-dotted line ML is calculated based on the signal outputted from the first image sensor 24. In this case, the distance Wa between the two edges E1 and E2 represents an outer diameter of the measurement object 500, as the axial center of the measurement object 500 is parallel to the Y direction.

On the other hand, as shown in FIG. 13B, the measurement object 500 is placed within the measurement space MS in a state in which the axial center of the measurement object 500 is inclined with respect to an axis parallel to the Y direction by a predetermined angle $\theta$, for example. With this, a distance Wb between the one edge E1 and the other edge E2 of the measurement object 500 positioned along the dashed-dotted line ML is calculated based on the signal outputted from the first image sensor 24. In this case, the distance Wb between the two edges E1 and E2 is greater than the outer diameter of the measurement object 500, as the axial center of the measurement object 500 is inclined with respect to the axis parallel to the Y direction.

Accordingly, it is not possible to accurately measure the outer diameter of the measurement object 500 when the axial center of the measurement object 500 is inclined with respect to the axis parallel to the Y direction. Therefore, in order to correct a measurement error produced when the measurement object 500 is positioned within the measurement space MS in an inclined manner, the CPU 321 performs inclination correction based on the received light amount distribution indicated by the signal outputted from the third image sensor 28.

Figure 14:
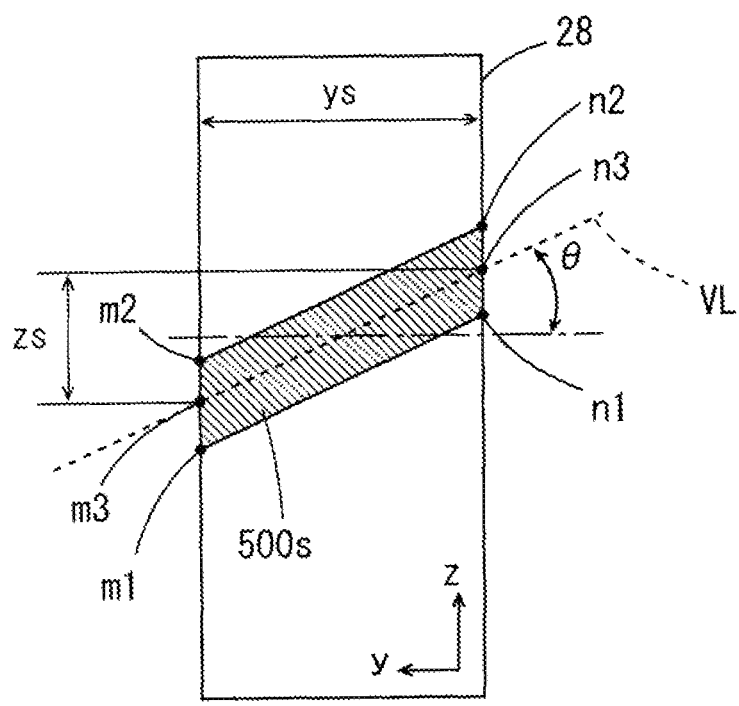
FIG. 14 is a schematic diagram for explaining inclination correction.

FIG. 14 is a schematic diagram for explaining the inclination correction. FIG. 14 shows an example of the received light amount distribution on the third image sensor 28 in the case where the measurement object 500 is positioned within the measurement space MS when the axial center of the measurement object 500 is inclined with respect to the axis parallel to the Y direction by the predetermined angle $\theta$.

In FIG. 14, arrows respectively indicate a y direction and a z direction corresponding to the Y direction and the Z direction in the measurement space MS. Further, the portion 500s of the received light amount distribution corresponding to the measurement object 500 is hatched.

In this case, the CPU 321 first detects pixel positions m1 and m2 where the received light amount distribution greatly changes along one side of the third image sensor 28 parallel to the z direction, and calculates a central position m3 between the two pixel positions m1 and m2.

Similarly, the CPU 321 detects pixel positions n1 and n2 where the received light amount distribution greatly changes along the other side of the third image sensor 28 parallel to the z direction, and calculates a central position n3 between the two pixel positions n1 and n2.

The positions along the one and the other sides parallel to the z direction where the received light amount distribution greatly changes on the third image sensor 28 correspond to the edges of the measurement object 500 in the Z direction. Thus, a straight line VL connecting the two calculated central positions m3 and n3 corresponds to the axial center of the measurement object 500 along the plane parallel to the Y direction and the Z direction.

In the third image sensor 28, the number of pixels ys in the y direction is known. Accordingly, the CPU 321 calculates the number of pixels zs between the two central positions m3 and n3 in the z direction, and calculates an inclination angle $\theta$ of the straight line VL with respect to the axis parallel to the y direction based on the number of pixels ys of the third image sensor 28 in the y direction and the calculated number of pixels zs. In this example, the inclination angle $\theta$ may be obtained based on the following equation (2).

$$\theta = \tan^{-1}(zs/ys) \quad (2)$$

The calculated inclination angle $\theta$ represents an inclination angle of the axial center of the measurement object 500 with respect to the axis parallel to the Y direction. Based on the calculated inclination angle $\theta$, the CPU 321 corrects the distance between the two edges E1 and E2 calculated based on the signal outputted from the first image sensor 24.

When the distance between the two edges E1 and E2 calculated based on the signal outputted from the first image sensor 24, the calculated inclination angle, and the distance between the two edges E1 and E2 after the correction are respectively represented by W1, $\theta$, and W2, the distance W2 between the two edges E1 and E2 after the correction is calculated based on the following equation (3).

$$W2 = W1 \times \cos\theta \quad (3)$$

In this manner, it is possible to further improve accuracy in the measurement of the measurement object 500 with the inclination correction. The CPU 321 may correct the calculation results of the positions of the edges E1 and E2 of the measurement object 500 in the Z direction based on the calculated inclination angle $\theta$.

The operation unit 325 of the controller 30 may be provided with a switch 325s for instructing the CPU 321 to perform the inclination correction. In this case, a user operates the switch 325s for inclination correction to cause the CPU 321 execute the inclination correction described above.

(6) Effects (6-1) In the optical measuring device 1 according to this embodiment, the position of the first focus FP1 of the first optical system 201 in the X direction and the position of the second focus FP2 of the second optical system 202 in the X direction within the measurement space MS are different from each other. With this, whether the measurement object 500 is positioned at the first focus FP1, on the side closer to the light projecting unit 10 with respect to the first focus FP1, or on the side away from the light projecting unit 10 with respect to the first focus FP1 is determined easily and correctly based on the signals outputted from the first image sensor 24 and the second image sensor 27. Further, the positional displacement amount ΔL1 of the measurement object 500 from the first focus FP1 is calculated.

The positions of the edges E1 and E2 of the measurement object 500 in the Z direction and the distance between the edges E1 and E2 are calculated based on the signal outputted from the first image sensor 24. In this case, by moving the measurement object 500 toward the first focus FP1 based on the determination result of the position of the measurement object 500 with respect to the first focus FP1, and the positional displacement amount ΔL1 of the measurement object 500 from the first focus FP1, it is possible to easily improve accuracy in the measurement of the positions of the edges E1 and E2 of the measurement object 500.

(6-2) When the measurement object 500 is positioned near the first focus FP1 in the X direction, the positional displacement amount ΔL2 of the measurement object 500 from the second focus FP2 is greater than the positional displacement amount ΔL1 of the measurement object 500 from the first focus FP1.

Therefore, by the calculation using the second evaluation value, it is possible to calculate the positional displacement amount ΔL2 of the measurement object 500 from the second focus FP2 at high accuracy as compared to the case where the positional displacement amount ΔL1 of the measurement object 500 from the first focus FP1 is calculated based on the calculation using the first evaluation value.

As a result, it is possible to calculate the positional displacement amount ΔL1 of the measurement object 500 from the first focus FP1 at high accuracy based on the positional displacement amount ΔL2 of the measurement object 500 from the second focus FP2 and the distance sp between the first focus FP1 and the second focus FP2. In addition, it is possible to determine the position of the measurement object 500 with respect to the first focus FP1 at high accuracy based on the calculated positional displacement amount ΔL1 of the measurement object 500 from the first focus FP1 and the first evaluation value.

The first image sensor 24 is used in the detection of the positions of the edges E1 and E2 of the measurement object 500, and the second image sensor 27 is used in the determination of the position of the measurement object 500 with respect to the first focus FP1. Accordingly, the second image sensor 27 does not necessarily have a high resolution as compared to the first image sensor 24. Therefore, as the second image sensor 27, it is possible to use a one-dimensional CCD image sensor that is more inexpensive and smaller than the first image sensor 24.

(6-3) In this embodiment, the received light amount distribution corresponding to the portion within the measurement space MS excluding the measurement object 500 out of the received light amount distribution indicated by the signal outputted from the first image sensor 24 is corrected based on the first reference data so as to become equal to the received light amount distribution obtained in a state in which the first optical system 201 is not tarnished nor dirty.

Similarly, the received light amount distribution corresponding to the portion within the measurement space MS excluding the measurement object 500 out of the received light amount distribution indicated by the signal outputted from the second image sensor 27 is corrected based on the second reference data so as to become equal to the received light amount distribution obtained in a state in which the second optical system 202 is not tarnished nor dirty.

With this, it is possible to measure the measurement object 500 at high accuracy even when the first optical system 201 and the second optical system 202 are tarnished or dirty.

(6-4) As described above, the CPU 321 generates the image data for displaying the position of the measurement object 500 in the X direction and the Z direction. As shown in FIG. 11, it is possible to obtain the XZ-plane image 401 indicating the position of the measurement object 500 in the X direction and the Z direction based on the generated image data. In this case, the user can easily and immediately recognize the position of the measurement object 500 in the X direction and the Z direction by visibly recognizing the XZ-plane image 401.

(6-5) As described above, the display unit 324 displays the image or text indicating that the measurement object 500 is outside the effective measurement region MA based on the measurement prohibiting signal supplied from the CPU 321. With this, even when the measurement object 500 is outside the effective measurement region MA, it is possible to move the measurement object 500 into the effective measurement region MA based on the display of the display unit 324.

[2] Second Embodiment

Figure 15:
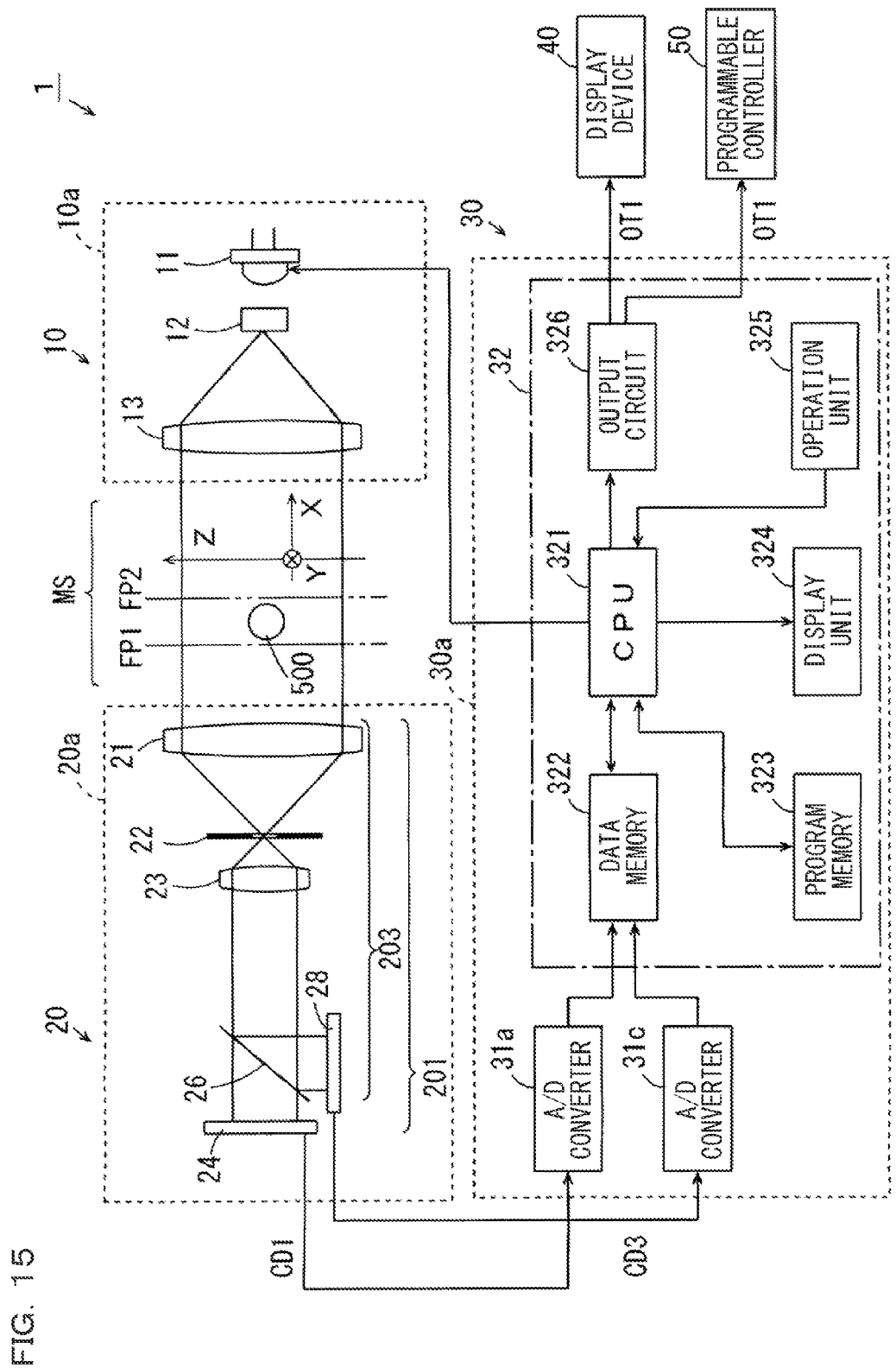
FIG. 15 is a block diagram showing a configuration of an optical measuring device according to a second embodiment.

FIG. 15 is a block diagram showing a configuration of an optical measuring device 1 according to a second embodiment. As shown in FIG. 15, in the optical measuring device 1 according to this embodiment, the light receiving unit 20 is not provided with the beam splitter 25 and the second image sensor 27 of FIG. 2, and the controller 30 is not provided with the A/D converter 31b of FIG. 2.

In the third image sensor 28, part of pixels arranged along the width direction of the collimated light directed from the second lens 23 and the half mirror 26 out of the plurality of pixels arranged two-dimensionally serve as the second image sensor 27 in the first embodiment. With this, in the measurement space MS, a focus of a third optical system 203 corresponding to the third image sensor 28 is positioned as the second focus FP2 at a position displaced from the first focus FP1. In this embodiment, an optical path from the first lens 21 to the third image sensor 28 in the light receiving unit 20 constitutes the third optical system 203.

With this, the CPU 321 measures the measurement object 500 based on the signal outputted from the first image sensor 24 and the signal outputted from the part of the pixels of the third image sensor 28. Further, the CPU 321 performs the inclination correction described above based on the signals outputted from all of the pixels of the third image sensor 28.

As described above, according to the optical measuring device 1 of the second embodiment, it is possible to calculate the position of the measurement object 500 in the X direction and to perform the inclination correction based on the signals outputted from the first image sensor 24 and the third image sensor 28, without providing the second image sensor 27 of FIG. 2. With this, it is possible to improve accuracy in the measurement of the measurement object 500 at low cost.

[3] Other Embodiments (1) According to the above embodiments, the received light amount distribution indicated by the signal outputted from the first image sensor 24 is differentiated. The first evaluation value corresponding to the positional displacement amount of the measurement object 500 from the first focus FP1 is calculated based on the differential value of the received light amount distribution. However, the present invention is not limited thereto, and the first evaluation value may be calculated by a different method. For example, the first evaluation value may be calculated based on a peak width of the differential value of the received light amount distribution.

Similarly, the received light amount distribution indicated by the signal outputted from the second image sensor 27 or the third image sensor 28 is differentiated. The second evaluation value corresponding to the positional displacement amount of the measurement object 500 from the second focus FP2 is calculated based on the differential value of the received light amount distribution. However, the present invention is not limited thereto, and the second evaluation value may be calculated by a different method. For example, the second evaluation value may be calculated based on a peak width of the differential value of the received light amount distribution.

(2) According to the above embodiments, the positional displacement amount $\Delta L2$ of the measurement object 500 from the second focus FP2 is calculated by the calculation using the second evaluation value, and the positional displacement amount $\Delta L1$ of the measurement object 500 from the first focus FP1 is calculated based on the calculated positional displacement amount $\Delta L2$ of the measurement object 500 and the distance sp between the first focus FP1 and the second focus FP2. However, the positional displacement amount $\Delta L1$ of the measurement object 500 from the first focus FP1 may be calculated using the first evaluation value, in place of the second evaluation value. In this case, the positional displacement amount $\Delta L1$ of the measurement object 500 from the first focus FP1 is directly calculated without calculating the positional displacement amount $\Delta L2$ of the measurement object 500 from the second focus FP2. Therefore, it is possible to reduce time for calculation of the positional displacement amount $\Delta L1$.

(3) According to the above embodiments, the belt-like collimated light is projected into the measurement space MS. However, diffusing light may be projected into the measurement space MS, in place of the collimated light. In this case as well, since the position of the first focus FP1 of the first optical system 201 in the light receiving unit 20 and the position of the second focus FP2 of the second optical system 202 or the third optical system 203 in the light receiving unit 20 are different from each other, it is possible to determine the position of the measurement object 500 with respect to the first focus FP1 in the X direction based on the signals outputted from the first image sensor 24 and the second image sensor 27 or based on the signals outputted from the first image sensor 24 and the third image sensor 28.

(4) According to the above embodiments, the positional displacement amount $\Delta L1$ of the measurement object 500 from the first focus FP1 is calculated by the calculation using the second evaluation value. Accordingly, when the threshold value TH is stored in the data memory 322, the first relation between the position of the measurement object 500 in the X direction and the first evaluation value may not be stored in the data memory 322.

[4] Correspondence Between Components in Claims and Components of Embodiments

Hereinafter, an example of correspondence between the components in the claims and the components of the embodiments will be described below, but the present invention is not limited to the described example.

According to the above embodiments, the measurement object 500 is an example of a measurement object, the measurement space MS is an example of a measurement space, the X direction is an example of a first direction, the light projecting unit 10 is an example of a light projecting unit, the first image sensor 24 is an example of a first light receiving unit, and the second image sensor 27 in the first embodiment and the third image sensor 28 in the second embodiment are examples of a second light receiving unit.

Further, the first focus FP1 is an example of a first focus, the first optical system 201 is an example of a first optical system, the second focus FP2 is an example of a second focus, and the second optical system 202 in the first embodiment and the third optical system 203 in the second embodiment are examples of a second optical system.

Further, the Z direction is an example of a second direction, the CPU 321 is an example of a control unit, the state in which the measurement object 500 is positioned on the side closer to the light projecting unit 10 with respect to the first focus FP1 is an example of a first state, the state in which the measurement object 500 is positioned on the side away from the light projecting unit 10 with respect to the first focus FP1 is an example of a second state, the state in which the measurement object 500 is positioned at the first focus FP1 is an example of a third state, and the optical measuring device 1 is an example of an optical measuring device.

Moreover, the first evaluation value is an example of a first value, the second evaluation value is an example of a second value, the first reference data is an example of a first reference data, the second reference data is an example of a second reference data, the data memory 322 is an example of a storage unit, the effective measurement region MA is an example of an effective measurement region, and the measurement prohibiting signal is an example of a notification signal.

Furthermore, the first image sensor 24 is an example of a first image sensor, and the second image sensor 27 in the first embodiment and the third image sensor 28 in the second embodiment are examples of a second image sensor.

In addition, the third image sensor 28 in the second embodiment is an example of a third light receiving unit and a third image sensor, and the third optical system 203 in the second embodiment is an example of a third optical system.

Various other components having the configuration or the function described in the claims may also be used as the components in the claims.

The present invention may be effectively applied to various optical measuring devices and optical measurement methods.

What is claimed is:
1. An optical measuring device comprising:
a light projecting unit configured to project light into a measurement space in which a measurement object is to be placed, the light being projected in parallel to a first direction;
a first light receiving unit and a second light receiving unit each configured to output a signal indicating a received light amount;
a first optical system having a first focus within the measurement space, and configured to direct the light projected from the light projecting unit and passing through the measurement space toward the first light receiving unit;
a second optical system having a second focus within the measurement space, and configured to direct the light projected from the light projecting unit and passing through the measurement space toward the second light receiving unit, the second focus being at a position different from a position of the first focus in the first direction; and
a control unit configured to calculate a position of the measurement object in a second direction based on the signal outputted from the first light receiving unit, the second direction intersecting the first direction, wherein the control unit determines whether the measurement object is in a first state, a second state, or a third state based on the signals outputted from the first light receiving unit and the second light receiving unit, the first state being a state in which the measurement object is positioned on a side closer to the light projecting unit with respect to the first focus in the first direction, the second state being a state in which the measurement object is positioned on a side away from the light projecting unit with respect to the first focus, the third state being a state in which the measurement object is positioned at the first focus.

2. The optical measuring device according to claim 1, wherein the control unit calculates a positional displacement amount of the measurement object from the first focus in the first direction based on at least one of the signal outputted from the first light receiving unit and the signal outputted from the second light receiving unit.

3. The optical measuring device according to claim 2, wherein the control unit is configured to:
calculate a first value corresponding to the positional displacement amount of the measurement object from the first focus in the first direction based on the calculation of the signal outputted from the first light receiving unit;
calculate a second value corresponding to a positional displacement amount of the measurement object from the second focus in the first direction based on the calculation of the signal outputted from the second light receiving unit;
calculate the positional displacement amount of the measurement object from the first focus in the first direction based on at least one of the calculated first value and the calculated second value; and
determine whether the measurement object is in the first state, the second state, or the third state based on the first value and the second value.

4. The optical measuring device according to claim 3, wherein the control unit is configured to:
calculate the positional displacement amount of the measurement object from the first focus in the first direction based on the calculation using the calculated second value; and
determine whether the measurement object is in the first state, the second state, or the third state based on the calculated positional displacement amount and the calculated first value.

5. The optical measuring device according to claim 2, further comprising:

a storage unit configured to previously store first reference data and second reference data, the first reference data and the second reference data respectively indicating reference received light amount distributions of the first light receiving unit and the second light receiving unit when the measurement object is absent within the measurement space, wherein upon the measurement of the measurement object, the control unit:
corrects the signals outputted from the first light receiving unit and the second light receiving unit based on the first reference data and the second reference data stored in the storage unit, such that received light amount distributions corresponding to a portion in the measurement space excluding the measurement object out of the received light amount distributions indicated by the signals outputted from the first light receiving unit and the second light receiving unit become equal to the reference received light amount distributions;
calculates the position of the measurement object in the second direction intersecting the first direction based on the corrected signal outputted from the first light receiving unit;
determines whether the measurement object is in the first state, the second state, or the third state based on the corrected signals outputted from the first light receiving unit and the second light receiving unit; and
calculates the positional displacement amount of the measurement object from the first focus in the first direction based on at least one of the corrected signal outputted from the first light receiving unit and the corrected signal outputted from the second light receiving unit.

6. The optical measuring device according to claim 2, wherein the control unit generates image data for displaying an image indicating the position of the measurement object in the first direction and the second direction based on the calculated position of the measurement object in the second direction and the calculated positional displacement amount of the measurement object in the first direction.

7. The optical measuring device according to claim 2, wherein the control unit determines, based on the calculated position of the measurement object in the second direction and the calculated positional displacement amount of the measurement object in the first direction, whether or not the measurement object is positioned within a previously defined effective measurement region, and generates, when the measurement object is positioned outside the effective measurement region, a notification signal indicating that the measurement object is outside the effective measurement region.

8. The optical measuring device according to claim 1, wherein the light projecting unit is configured to project collimated light having a prescribed width into the measurement space,
the first optical system is configured to direct the collimated light passing through the measurement space toward the first light receiving unit,
the second optical system is configured to direct the collimated light passing through the measurement space toward the second light receiving unit,
the first light receiving unit includes a first image sensor having a plurality of pixels arranged along a width direction of the collimated light directed by the first optical system,
the second light receiving unit includes a second image sensor having a plurality of pixels arranged along the width direction of the collimated light directed by the second optical system, and
the control unit is configured to calculate a position of an edge of the measurement object in the second direction based on the signal outputted from the first image sensor.

9. The optical measuring device according to claim 8, wherein the second image sensor includes a plurality of pixels arranged two-dimensionally along the width direction and a thickness direction of the collimated light directed by the second optical system, and the control unit is configured to detect an inclination of the edge of the measurement object with respect to the thickness direction of the collimated light based on the signal outputted from the second image sensor, and correct the calculated position of the edge of the measurement object based on the detected inclination.

10. The optical measuring device according to claim 8, further comprising:

a third light receiving unit configured to output a signal indicating a received light amount; and a third optical system configured to direct the collimated light passing through the measurement space toward the third light receiving unit, wherein the third light receiving unit includes a third image sensor having a plurality of pixels arranged two-dimensionally along the width direction and a thickness direction of the collimated light directed by the third optical system, and the control unit is configured to detect an inclination of the edge of the measurement object with respect to the thickness direction of the collimated light based on the signal outputted from the third image sensor, and correct the calculated position of the edge of the measurement object based on the detected inclination.

* * * * *